(12) United States Patent
Pike

(10) Patent No.: US 12,466,213 B1
(45) Date of Patent: Nov. 11, 2025

(54) ADJUSTABLE CASTER MOUNTING PLATE

(71) Applicant: Dalton Pike, Red Oak, TX (US)

(72) Inventor: Dalton Pike, Red Oak, TX (US)

( * ) Notice: Subject to any disclaimer, the term of this patent is extended or adjusted under 35 U.S.C. 154(b) by 0 days.

(21) Appl. No.: 18/626,944

(22) Filed: Apr. 4, 2024

(51) Int. Cl.
*B60B 33/00* (2006.01)

(52) U.S. Cl.
CPC ...... *B60B 33/0023* (2013.01); *B60B 33/0007* (2013.01); *B60B 33/0018* (2013.01); *B60B 33/0036* (2013.01); *B60B 2360/10* (2013.01); *B60B 2360/30* (2013.01)

(58) Field of Classification Search
CPC ............ B60B 33/0002; B60B 33/0005; B60B 33/0007; B60B 33/001; B60B 33/0013; B60B 33/0015; B60B 33/0018; B60B 33/0021; B60B 33/0023; B60B 33/0026; B65D 90/18; A47B 91/02; B62B 1/268
USPC ........ 16/29, 19; 248/346.06, 346.11, 346.07; 269/17; 280/79.7
See application file for complete search history.

(56) References Cited

U.S. PATENT DOCUMENTS

| | | | | |
|---|---|---|---|---|
| 1,532,064 A | * | 3/1925 | Neiswender | B60B 33/0002 16/21 |
| 2,397,315 A | * | 3/1946 | Harris | B62B 5/0083 280/47.32 |
| 2,816,771 A | * | 12/1957 | Hunt | B60B 33/0063 280/47.131 |
| 3,478,381 A | * | 11/1969 | Schultz, Jr. | B60B 33/0002 16/31 R |
| 3,580,601 A | * | 5/1971 | Miles | B62B 3/009 248/176.1 |
| 3,861,662 A | * | 1/1975 | Morse | B62B 1/268 269/904 |
| 3,879,798 A | * | 4/1975 | Krulwich | A45C 5/143 16/30 |
| 4,187,578 A | * | 2/1980 | Little | B60B 33/0002 29/897 |
| 4,210,341 A | * | 7/1980 | Minkoff | B60B 33/00 280/79.11 |
| 4,270,741 A | * | 6/1981 | Hurst | B25B 5/04 269/33 |
| 4,940,252 A | * | 7/1990 | Seib | B60B 33/00 280/47.131 |
| 5,115,608 A | * | 5/1992 | Abraham | E04B 1/8236 D25/138 |
| 5,129,170 A | * | 7/1992 | Fusilli | E01H 5/066 37/231 |
| 5,457,849 A | * | 10/1995 | Branson | H05K 7/186 16/33 |
| D366,547 S | * | 1/1996 | Arn | D34/23 |
| 5,486,014 A | * | 1/1996 | Hough | B62B 5/0083 24/535 |
| 5,575,036 A | * | 11/1996 | May | B60B 33/0018 16/34 |

(Continued)

FOREIGN PATENT DOCUMENTS

JP H09104202 A * 4/1997

*Primary Examiner* — Jeffrey O'Brien
(74) *Attorney, Agent, or Firm* — James E. Walton

(57) ABSTRACT

A adjustable caster mounting plate for moving modular structures or other heavy materials with a mounting plate, a caster assembly attached to the bottom of the mounting plate, a primary guide tab attached to the top of the mounting plate, a secondary guide tab attached to the top of the mounting plate, and a mounting tab disposed on the top surface of the mounting plate.

19 Claims, 38 Drawing Sheets

(56) References Cited

U.S. PATENT DOCUMENTS

| | | | | |
|---|---|---|---|---|
| 5,899,650 A * | 5/1999 | Collins | B62B 1/268 | 280/47.11 |
| 5,927,731 A * | 7/1999 | Clarke | E04F 21/0023 | 280/47.24 |
| 6,592,134 B2 * | 7/2003 | Abraham | B62B 5/0083 | 280/47.3 |
| 6,826,800 B2 * | 12/2004 | Kao | B60B 33/0018 | 16/31 R |
| 6,904,641 B2 * | 6/2005 | Magoto | B60B 33/04 | 16/DIG. 34 |
| 7,017,879 B2 * | 3/2006 | Wetterberg | A47B 47/02 | 248/346.11 |
| 7,040,583 B1 * | 5/2006 | Holland | A47F 3/12 | 248/122.1 |
| 7,162,772 B2 * | 1/2007 | Asher | B60B 33/0049 | 16/45 |
| 7,249,738 B2 * | 7/2007 | Kaczorowski | B60B 33/0039 | 248/346.11 |
| 7,350,621 B2 * | 4/2008 | Abraham | E06C 1/397 | 280/47.3 |
| 7,383,612 B2 * | 6/2008 | Bushey | B60B 33/0068 | 16/45 |
| 8,967,401 B2 * | 3/2015 | Wu | A47B 47/0083 | 403/217 |
| 8,997,312 B1 * | 4/2015 | Harris | B60D 1/665 | 16/29 |
| 10,933,693 B2 * | 3/2021 | Wells | B60B 33/0023 | |
| 11,912,324 B1 * | 2/2024 | Livingston, Jr. | B62B 3/102 | |
| 2003/0094554 A1 * | 5/2003 | Bushey | B60B 33/001 | 248/346.11 |
| 2005/0015928 A1 * | 1/2005 | Arsenault | B60B 33/0039 | 16/300 |
| 2008/0172829 A1 * | 7/2008 | White | B60B 33/0063 | 16/29 |
| 2009/0101437 A1 * | 4/2009 | Abraham | E06C 7/08 | 16/29 |
| 2009/0106897 A1 * | 4/2009 | Harrow | A47C 19/024 | 16/45 |
| 2020/0361504 A1 * | 11/2020 | Prescott | B60B 33/0068 | |

* cited by examiner

ADJUSTABLE CASTER MOUNTING PLATE

BACKGROUND

1. Field of the Invention

The present application generally relates to moving modular structures, and more particularly, to adjustable caster mounting plates attached to modular structures to facilitate movement.

2. Description of Related Art

Presently, casters attached to mounting plates have been in use for many years and have a long history of development. Caster mounting plates are utilized by attaching the mounting plates to the bottom of heavy items and structures to make supporting and moving those structures easier. One type of structure that benefits from the maneuverability provided by mounting plates with casters is modular structures. Modular structures are typically constructed in piecemeal fashion on an assembly line and as such, it is desirable that modular structures be moveable to get to each area for construction. However, because of how heavy and unwieldly modular structures are, it is difficult for individuals to move the modular structures without assistance and so mounting plates with casters are needed for support and movement. However, there are still issues that arise with the use of mounting plates as not every modular structure is structured the same which affects where mounting plates can attach. Multiple variations have been made over the years to adjust the versatility of mounting plates such as changing how plates attach to structures. Another focus has been on adjusting the shape of the mounting plate to secure more of the structure to the mounting plate during operation.

While multiple improvements have been made throughout the years to improve these systems, not all of them are cost effective or are long lasting, and many shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
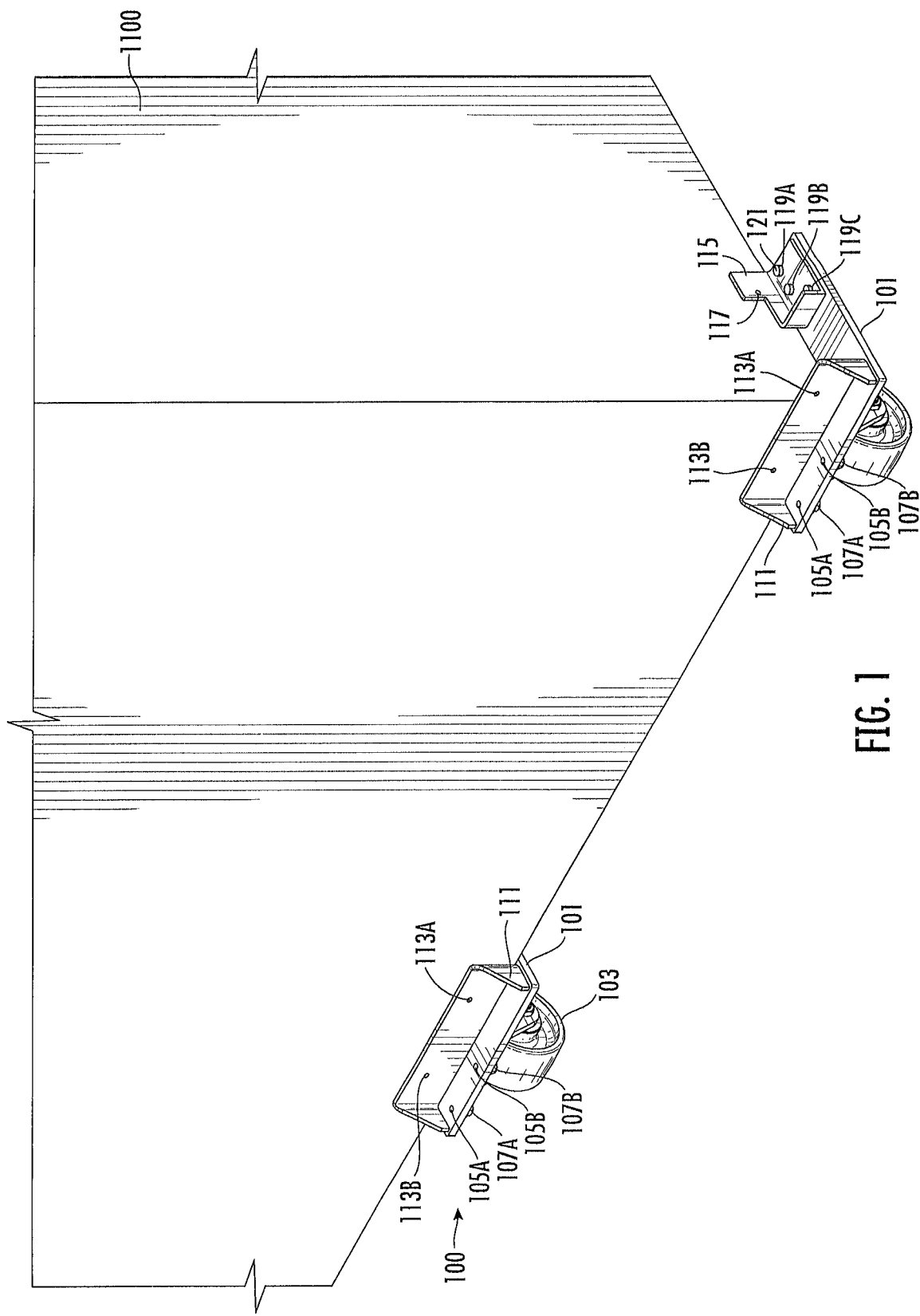
FIG. 1 is a perspective view of multiple adjustable mounting caster plates carrying a modular structure according to a preferred embodiment of the present application.
Figure 2:
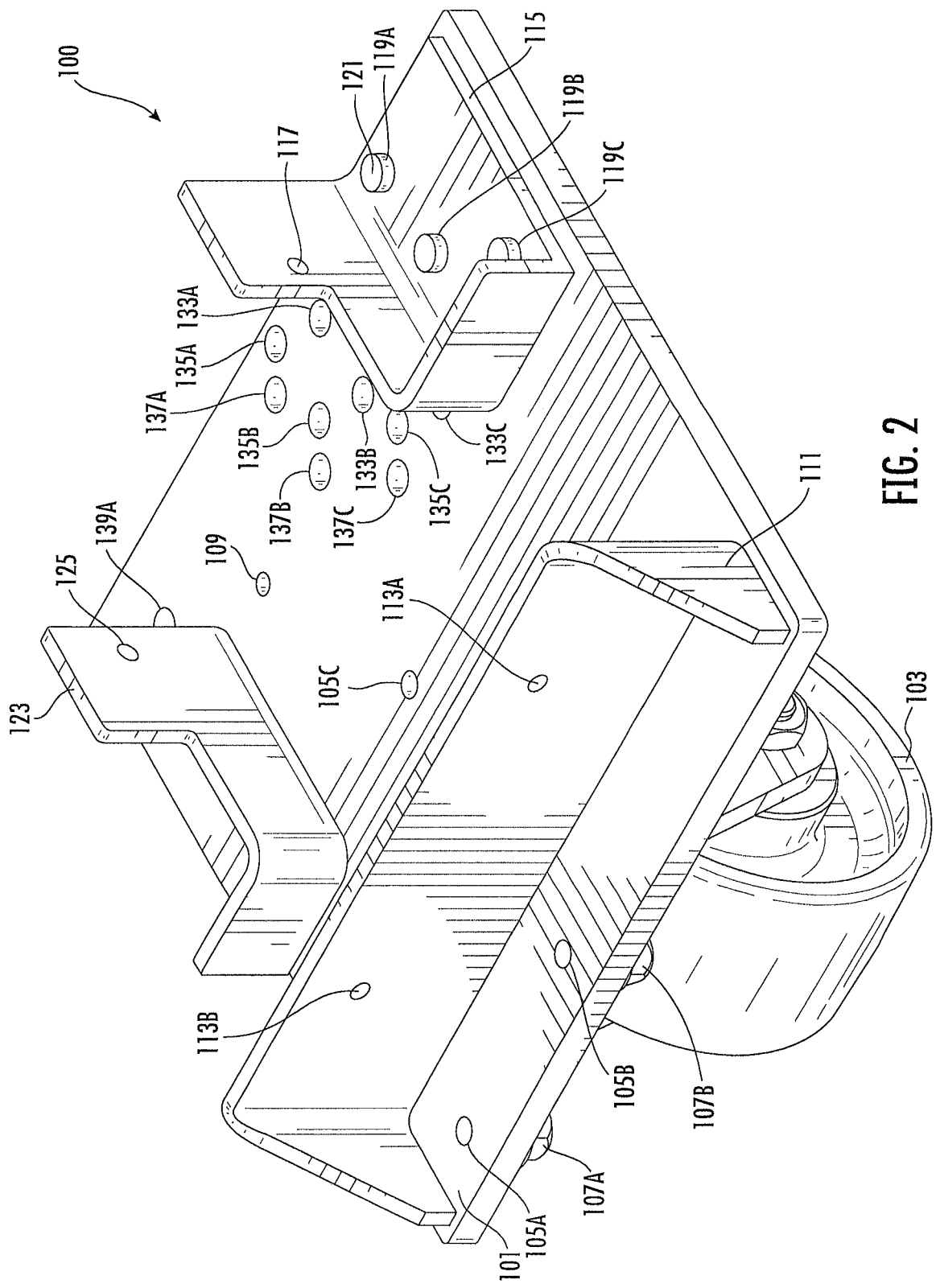
FIG. 2 is a perspective view of an adjustable mounting caster plate according to the preferred embodiment of the present application.
Figure 3:
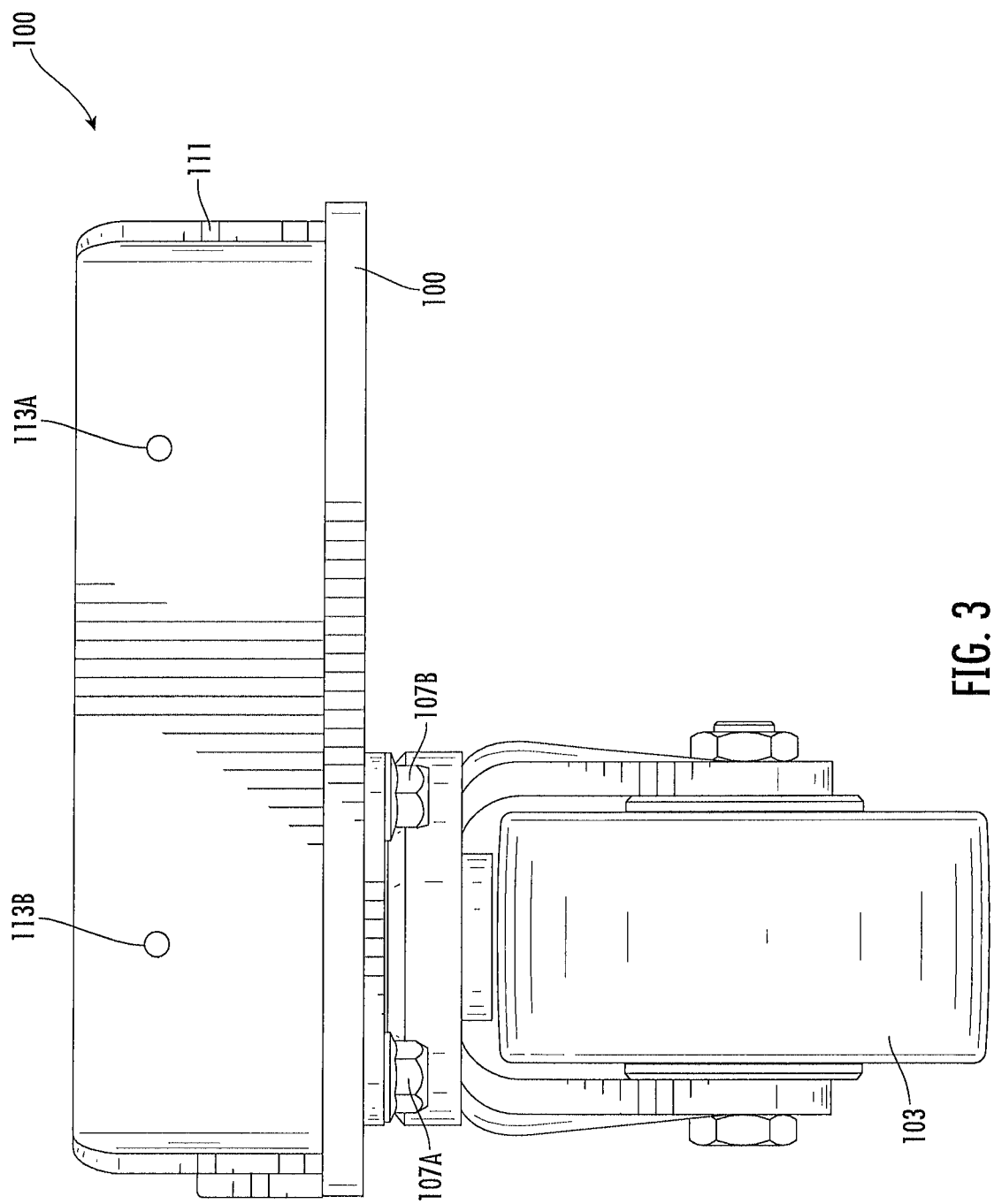
FIG. 3 is a front view of an adjustable mounting caster plate according to the preferred embodiment from FIG. 2.
Figure 4:
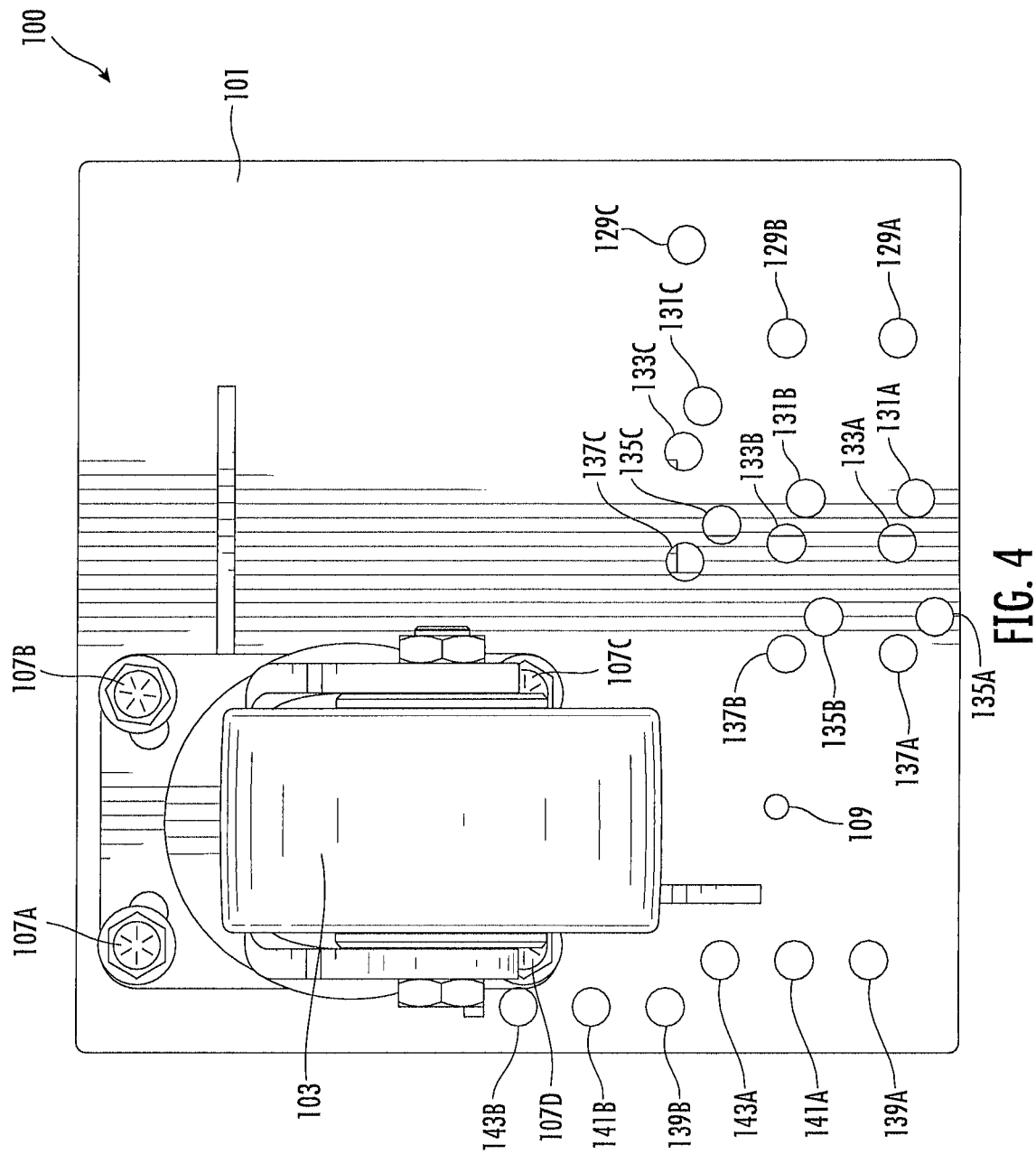
FIG. 4 is a bottom view of an adjustable mounting caster plate according to the preferred embodiment from FIG. 2.

While the method and device of the present application are susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of an adjustable mounting caster plate according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming but would nevertheless be a routine undertaking for those of ordinary skill in the art having the benefit of this disclosure. It is also appreciated that the use of "a" or "an" before a noun naming an object is construed to be that the noun refers to both the singular and the plural.

Referring now to FIGS. 1-12 in the drawings, differing views of adjustable caster mounting plate 100 according to the preferred embodiment of the present application are illustrated. Adjustable caster mounting plate 100 is generally comprised of base plate 101, caster assembly 103, apertures 105A-105D, caster fasteners 107A-107D, plate fastening hole 109, mounting tab 111, mounting tab fastening holes 113A-113B, primary adjustable guide tab 115, primary guide tab fastening hole 117, primary guide tab pin holes 119A-119C, pins 121, secondary adjustable guide tab 123, secondary guide tab fastening hole 125, secondary guide tab pin holes 127A-127B, primary guide tab first position apertures 129A-129C, primary guide tab second position apertures 131A-131C, primary guide tab third position apertures 133A-133C, primary guide tab fourth position apertures 135A-135C, primary guide tab fifth position apertures 137A-137C, secondary guide tab first position apertures 139A-139B, secondary guide tab second position apertures 141A-141B, secondary guide tab third position apertures 143A-143B, and modular structure 1100. FIG. 1 in the drawings depicts two adjustable caster mounting plates 100 in use secured to the base of a modular structure 1100. The base of modular structures 1100 are typically constructed from boards of wood or other firm materials aligned in a row with spaces between each board. The space between the boards is where caster systems can be attached to support modular structures 1100 as the space between the boards allows caster systems to be secured by attaching to both sides of a base board which increases the stability of the system when carrying and moving modular structure 1100. Once adjustable caster mounting plate 100 is attached to the base of modular structure 1100, an individual will be able to comfortably move modular structure 1100 along an assembly line for construction.

As seen in these drawings, the main features of adjustable caster mounting plate 100 are base plate 101, caster assembly 103, mounting tab 111, primary adjustable guide tab 115, and secondary adjustable guide tab 123. Base plate 101 functions as the base of adjustable caster mounting plate 100 and is a square piece of firm material. While the current embodiment has base plate 101 as a square section of material, alternative embodiments can also exist where base plate 101 is circular, triangular, or any other shape as long as base plate 101 has a flat top surface. The preferred material used for base plate 101 is metal, wood, hard plastic, or any other firm material that is able to support heavy weight structures. Modular structures 1100 are typically larger structures that are too heavy for an individual to comfortably move without assistance which is why caster systems are used to support and move structures 1100. If base plate 101 is not formed from a firm material as stated above, the weight of modular structure 1100 could cause base plate 101 to buckle and be inoperable. Further, base plate 101 is a wide flat plate which helps distribute the weight of modular structure 1100 to the entirety of base plate 101 instead of the weight being focused on one point which could cause base plate 101 to buckle under the weight.

Bored through the surface of base plate 101 are multiple series of apertures which are used to attach other components to base plate 101 such as caster assembly 103, primary adjustable guide tab 115, and secondary adjustable guide tab 123. One set of apertures in mounting plate are apertures 105A-105D which are used to secure caster assembly 103 to the underside of base plate 101. Caster assembly 103 is comprised of a wheel, axle base, and other mechanisms found in a standard caster assembly. Apertures 105A-105D are organized in a rectangular pattern to match the size and shape of the base of caster assembly 103. To secure caster assembly 103 to base plate 101, the base of caster assembly 103 is lined up with apertures 105A-105D and fasteners 107A-107D are inserted through the base of assembly 103 and up through apertures 105A-105D to secure assembly 103 to base plate 101. Fasteners 107A-107D do not extend beyond the top surface of base plate 101 when inserted and instead are flush with the surface of base plate 101.

Another series of apertures within base plate 101 are primary guide tab first position apertures 129A-129C, primary guide tab second position apertures 131A-131C, primary guide tab third position apertures 133A-133C, primary guide tab fourth position apertures 135A-135C, and primary guide tab fifth position apertures 137A-137C which are each a series of three apertures used to secure primary adjustable guide tab 115 to base plate 101. While the current embodiment has five sets of primary position apertures with each set having three apertures, alternative embodiments can also exist where there are more than five or less than five sets of primary position apertures on base plate 101 and where each set can have more than three apertures or less than three apertures. The primary position apertures start on the right side of base plate 101 with primary guide tab first position apertures 129A-129C and continue towards the center of base plate 101 with primary guide tab fifth position apertures 137A-137C. Each of the primary position apertures are a location where primary adjustable guide tab 115 can be secured on the surface of base plate 101 as seen in FIGS. 7-10. Primary adjustable guide tab 115 will be secured to one of these positions depending on the width of the base board used for modular structure 1100 so that the base board will be secured between primary adjustable guide tab 115 and secondary adjustable guide tab 123.

Figure 5:
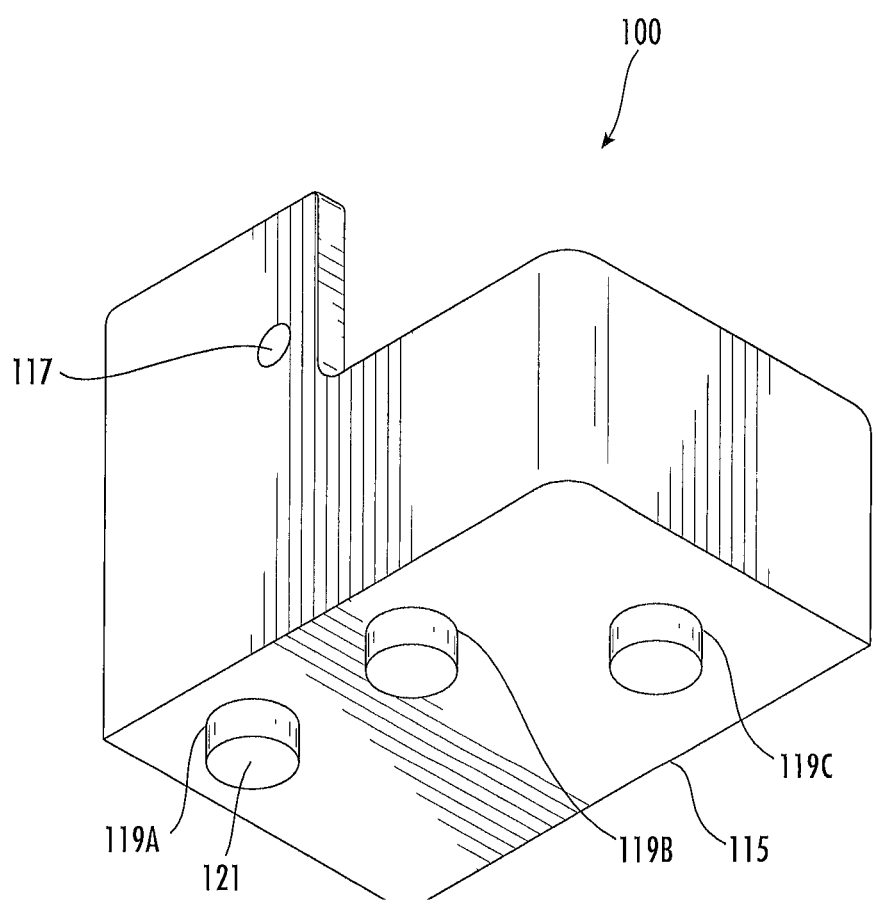
FIG. 5 is a perspective view of an adjustable guide tab used with the adjustable mounting caster plate according to the preferred embodiment from FIG. 2.

As seen in FIG. 5, primary adjustable guide tab 115 is shaped similar to a joint brace with a square base portion and two upstanding walls that protrude up from two sides of the base portion. While two upstanding walls are shown in the present application for primary adjustable guide tab 115, it is appreciated that alternative embodiments can also exist where there is only one upstanding wall attached to the base portion or where there can be as many as four upstanding walls enclosing the base portion of guide tab 115. Within the base portion of primary adjustable guide tab 115 there are primary guide tab pin holes 119A-119C which is a series of three holes positioned to match the shape and pattern of the series of primary position apertures in base plate 101. While the current embodiment of primary guide tab pin holes 119A-119C use three holes, alternative embodiments can also exist where there are more than three pin holes or less than three pin holes to match the amount of the primary position apertures in base plate 101. The base portion of guide tab 115 further has pins 121 inserted through and secured within pin holes 119A-119C either by welding or fasteners. As seen in the current embodiment, the top of pins 121 protrude up from the base portion of guide tab 115 once inserted, however, alternative embodiments exist where the tops of pins 121 are removed to have pins 121 flush with the surface of the base portion of guide tab 115.

Also shown in FIG. 5, pins 121 extend down from the base portion of primary adjustable guide tab 115 and function as the coupling mechanism for securing guide tab 115 to base plate 101. When securing primary adjustable guide tab 115 to base plate 101, pins 121 will be positioned over the desired primary position apertures such that pins 121 will be aligned with the position apertures. Once aligned, pins 121 are inserted through the position apertures securing primary adjustable guide tab 115 to the surface of base plate 101. When pins 121 are inserted, pins will be flush with the lower surface of base plate 101, however, other embodiments can exist where longer pins 121 are used which extend beyond the lower surface of base plate 101. Primary adjustable guide tab 115 further has primary guide tab fastening hole 117 through the upstanding wall of tab 115 which is a location where a screw, nail, or other fastener can be inserted to connect guide tab 115 to a base board of modular structure 1100 when in use.

Figure 6:
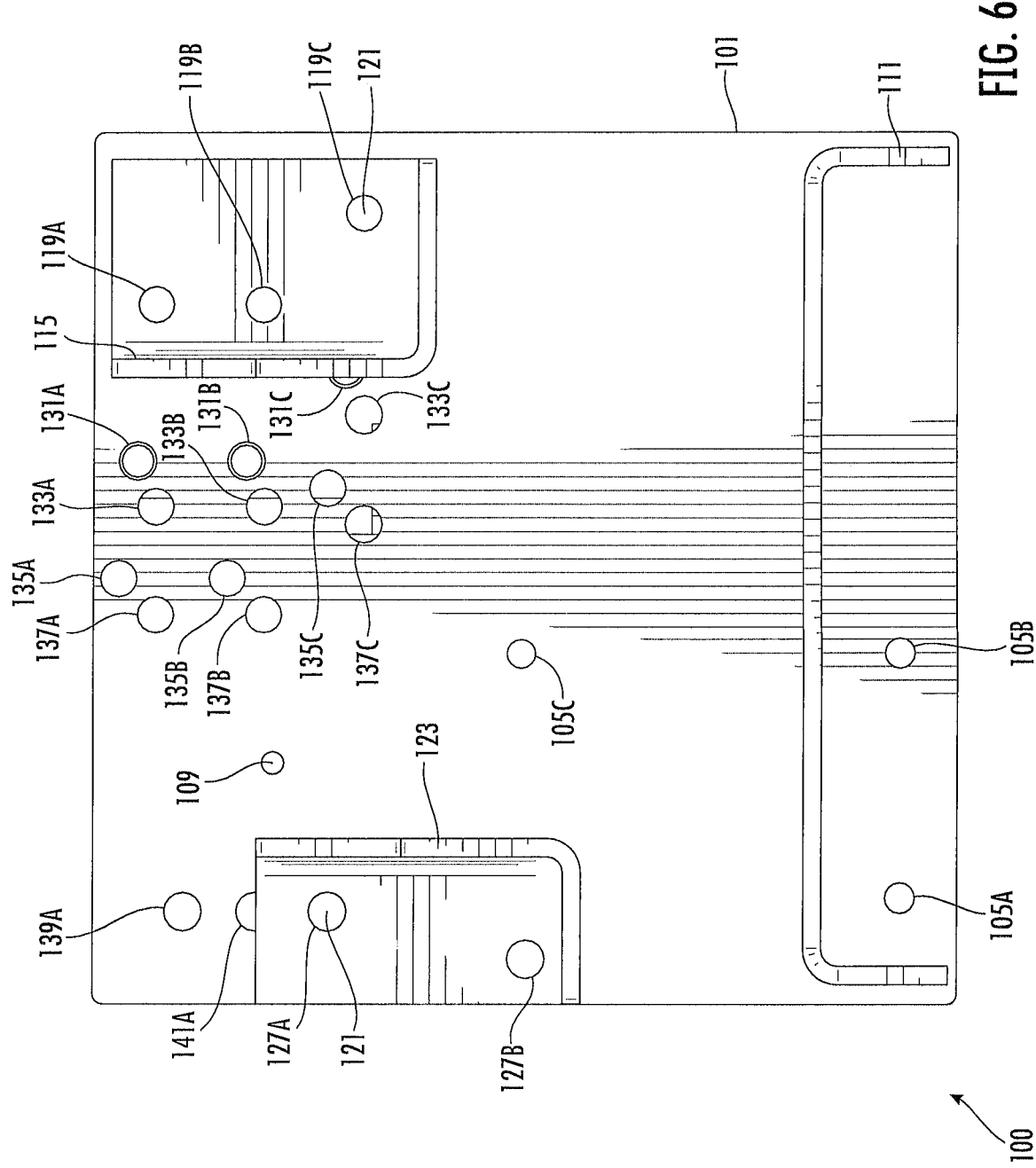
FIG. 6 is a top view of an adjustable mounting caster plate according to the preferred embodiment from FIG. 2.
Figure 7:
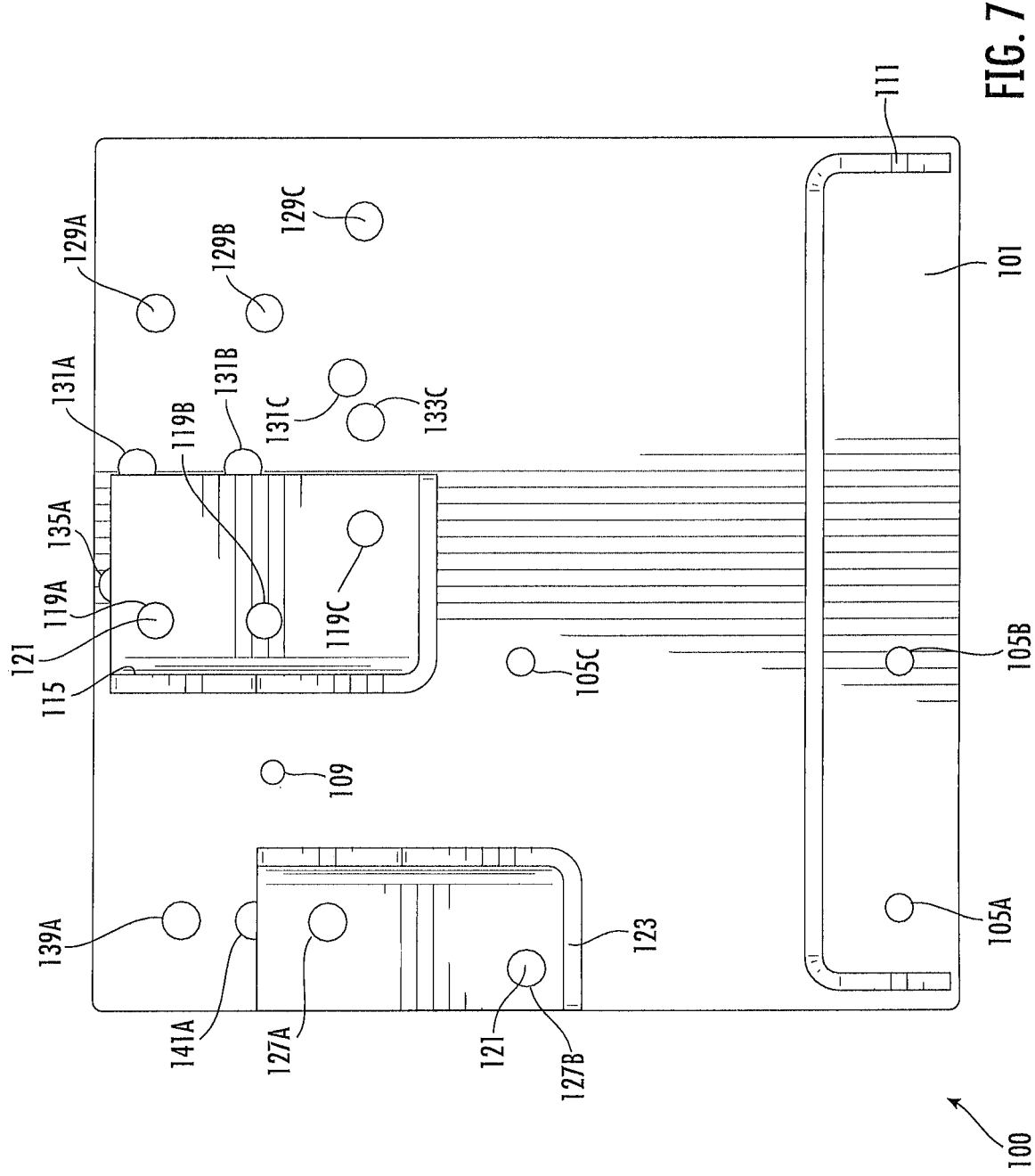
FIG. 7 is a top view of an adjustable mounting caster plate according to the preferred embodiment from FIG. 2.
Figure 8:
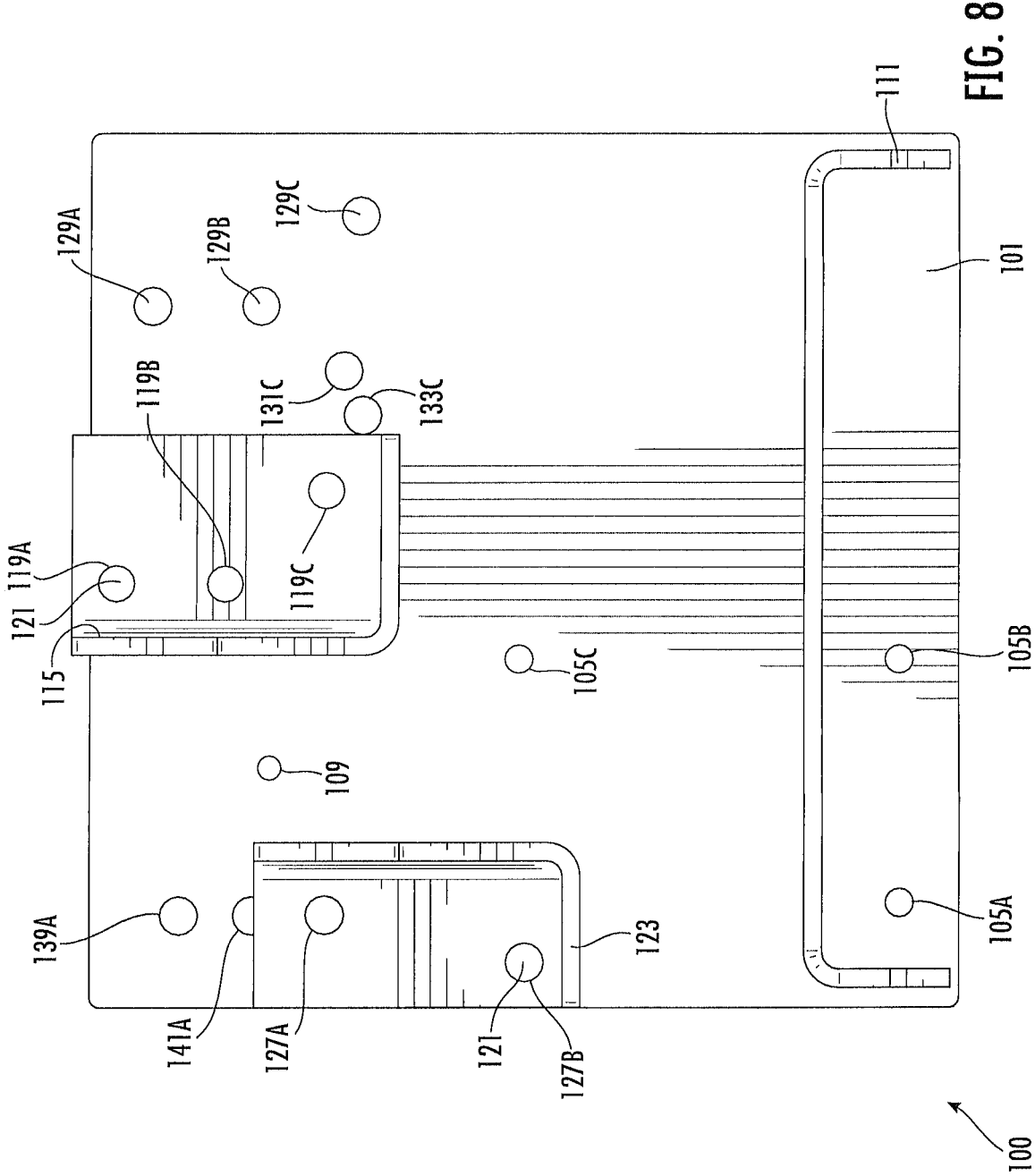
FIG. 8 is a top view of an adjustable mounting caster plate according to the preferred embodiment from FIG. 2.
Figure 9:
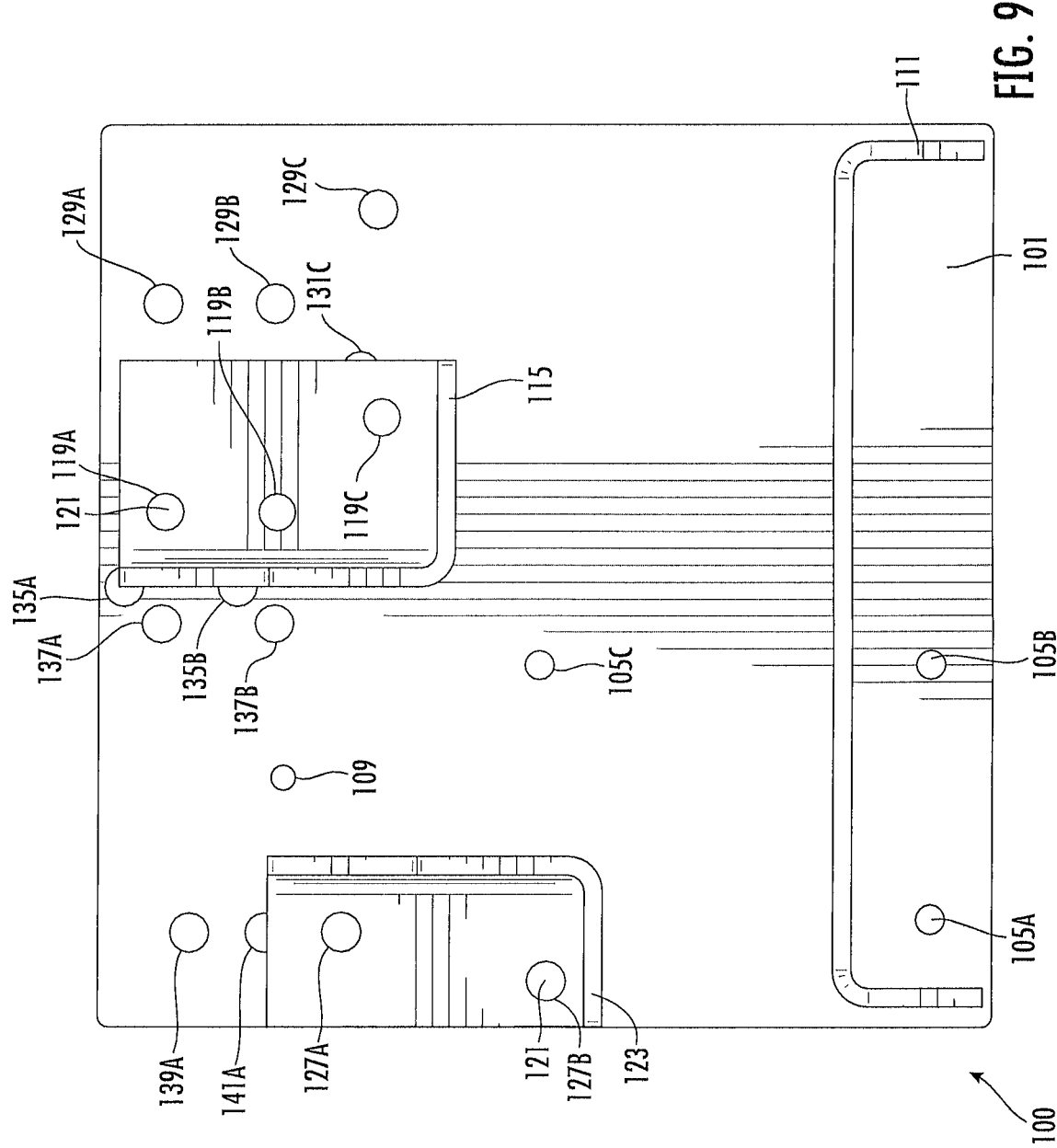
FIG. 9 is a top view of an adjustable mounting caster plate according to the preferred embodiment from FIG. 2.
Figure 10:
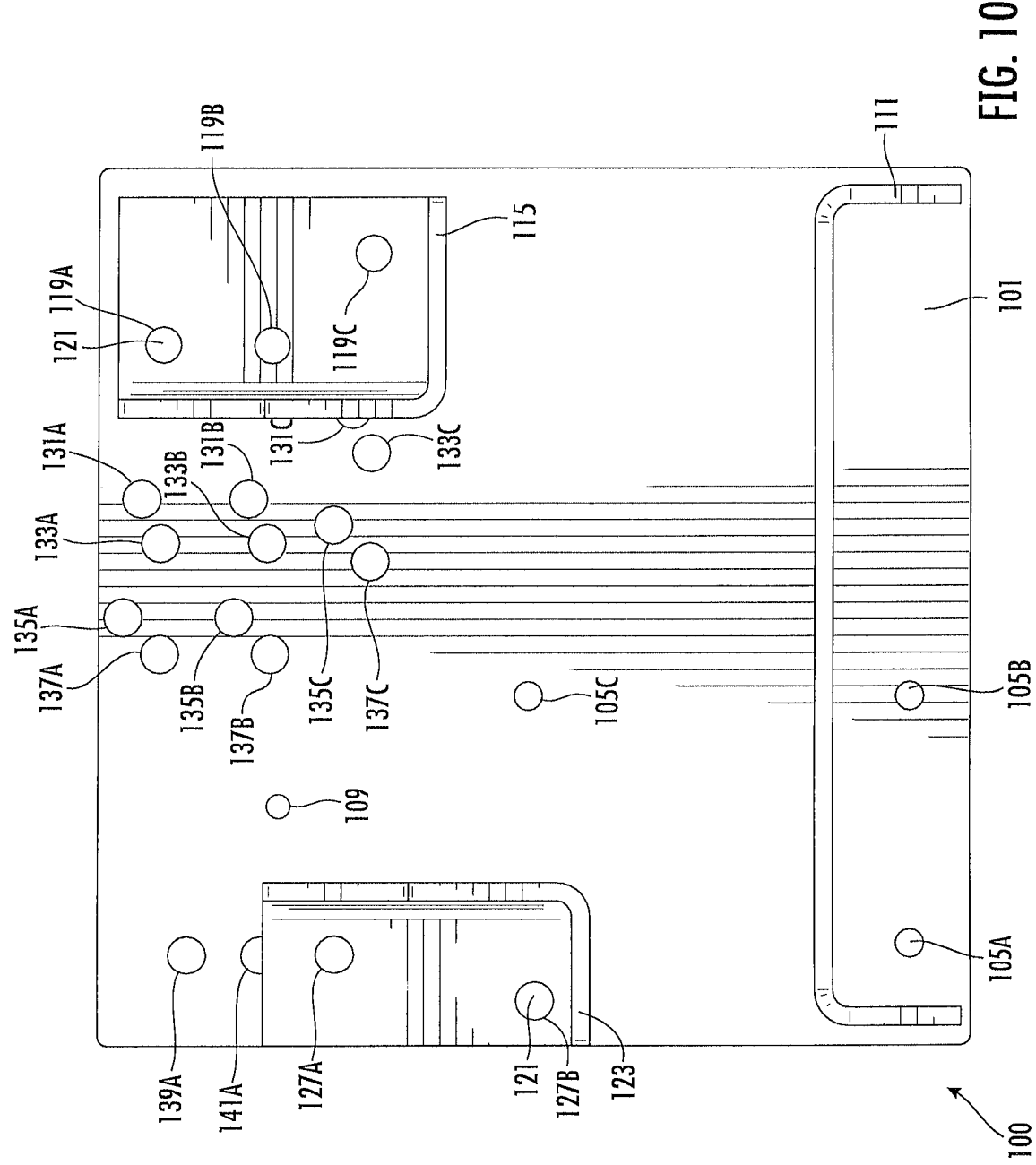
FIG. 10 is a top view of an adjustable mounting caster plate according to the preferred embodiment from FIG. 2.
Figure 11:
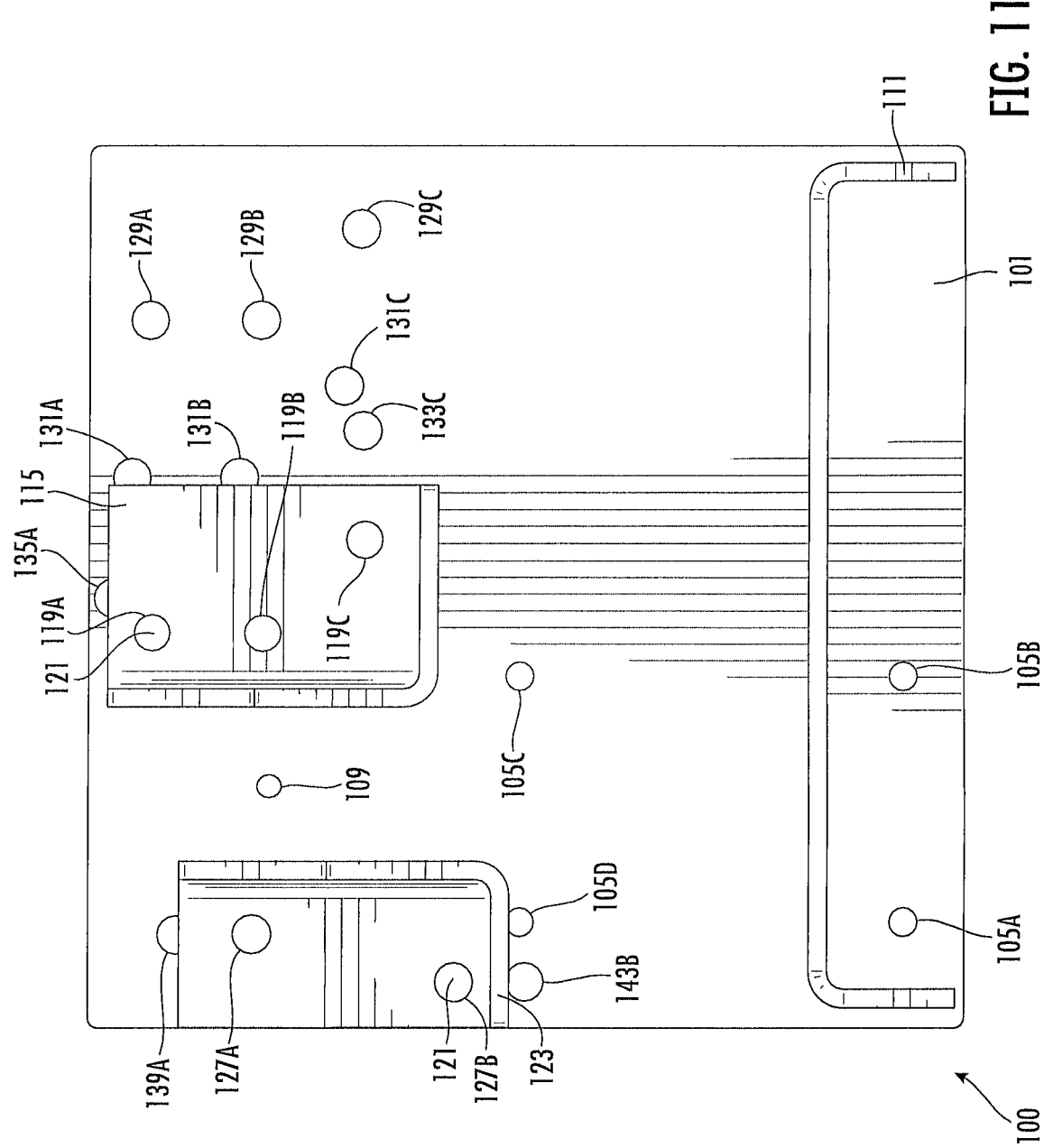
FIG. 11 is a top view of an adjustable mounting caster plate according to the preferred embodiment from FIG. 2.
Figure 12:
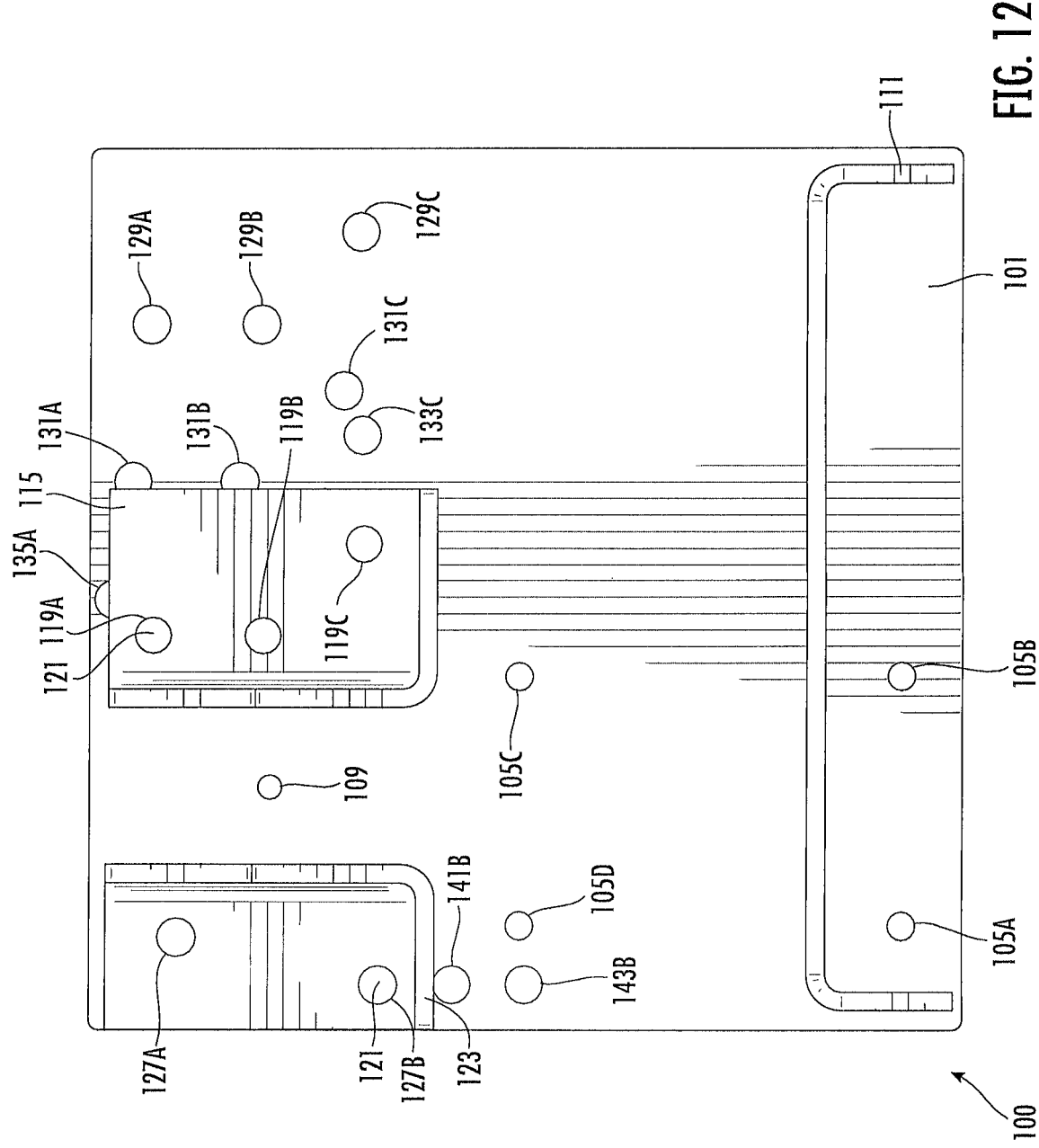
FIG. 12 is a top view of an adjustable mounting caster plate according to the preferred embodiment from FIG. 2.
Figure 13:
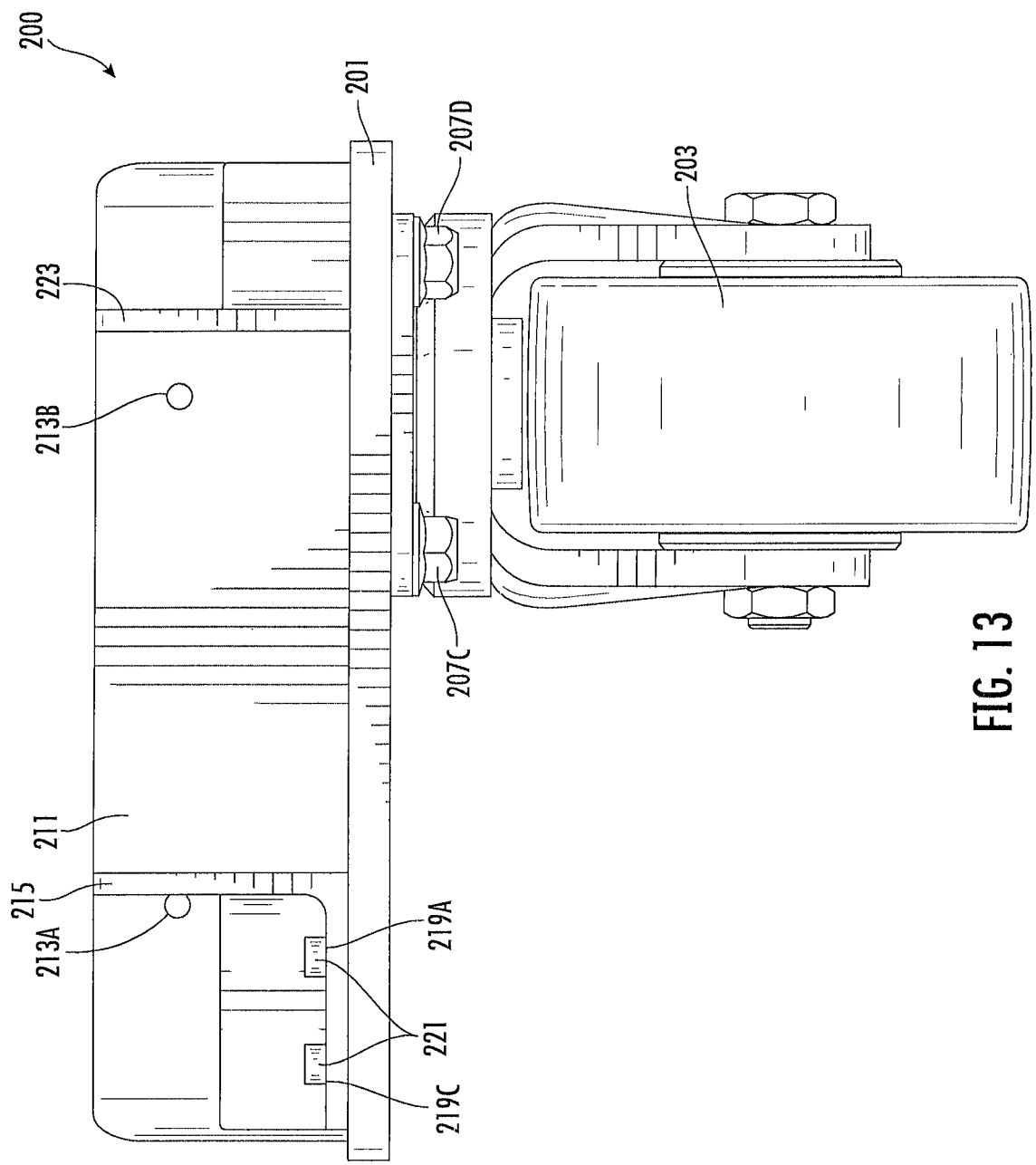
FIG. 13 is a back view of an alternative embodiment of an adjustable mounting caster plate of the present application.
Figure 14:
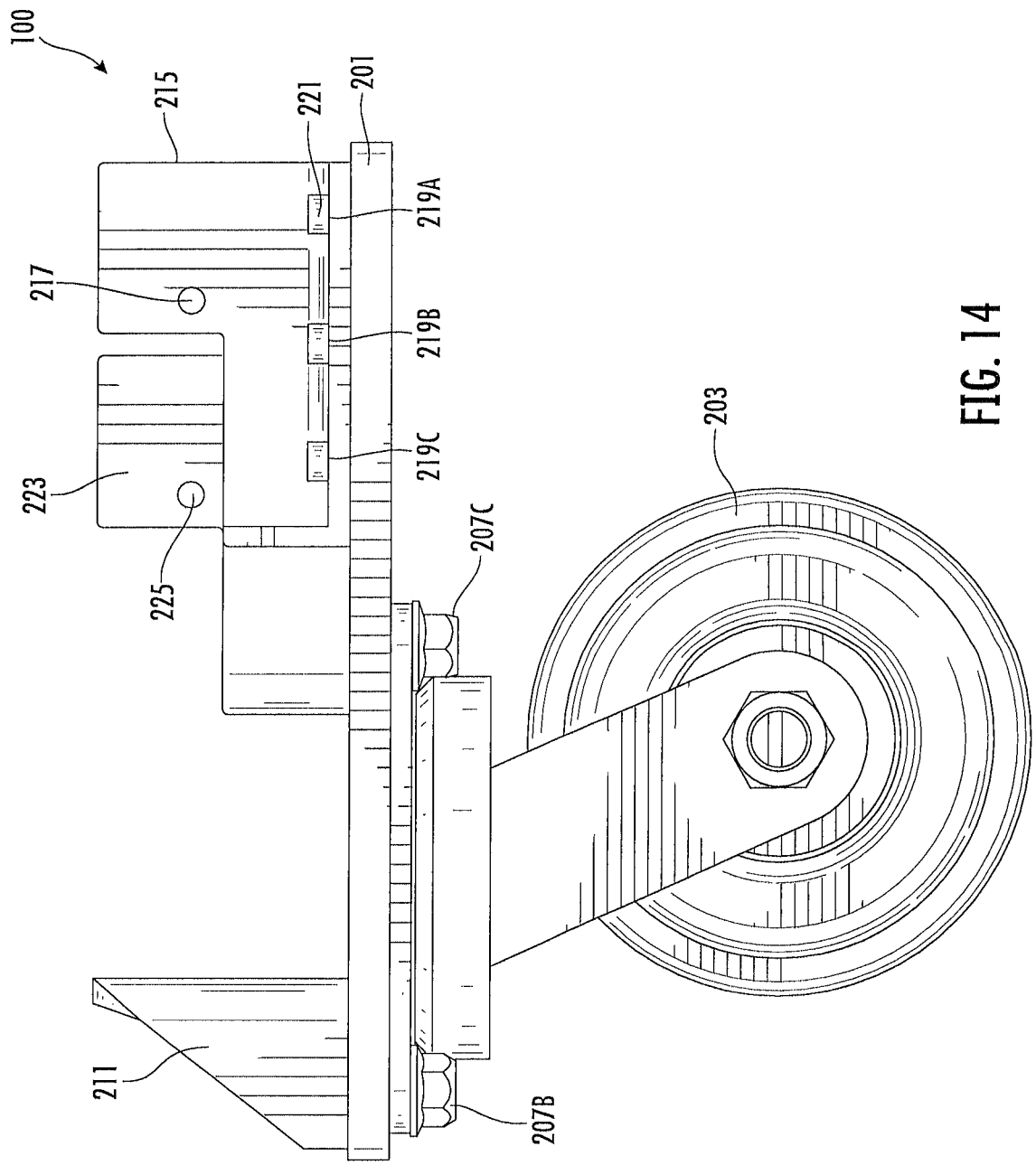
FIG. 14 is a side view of an alternative embodiment of an adjustable mounting caster plate from FIG. 13.
Figure 15:
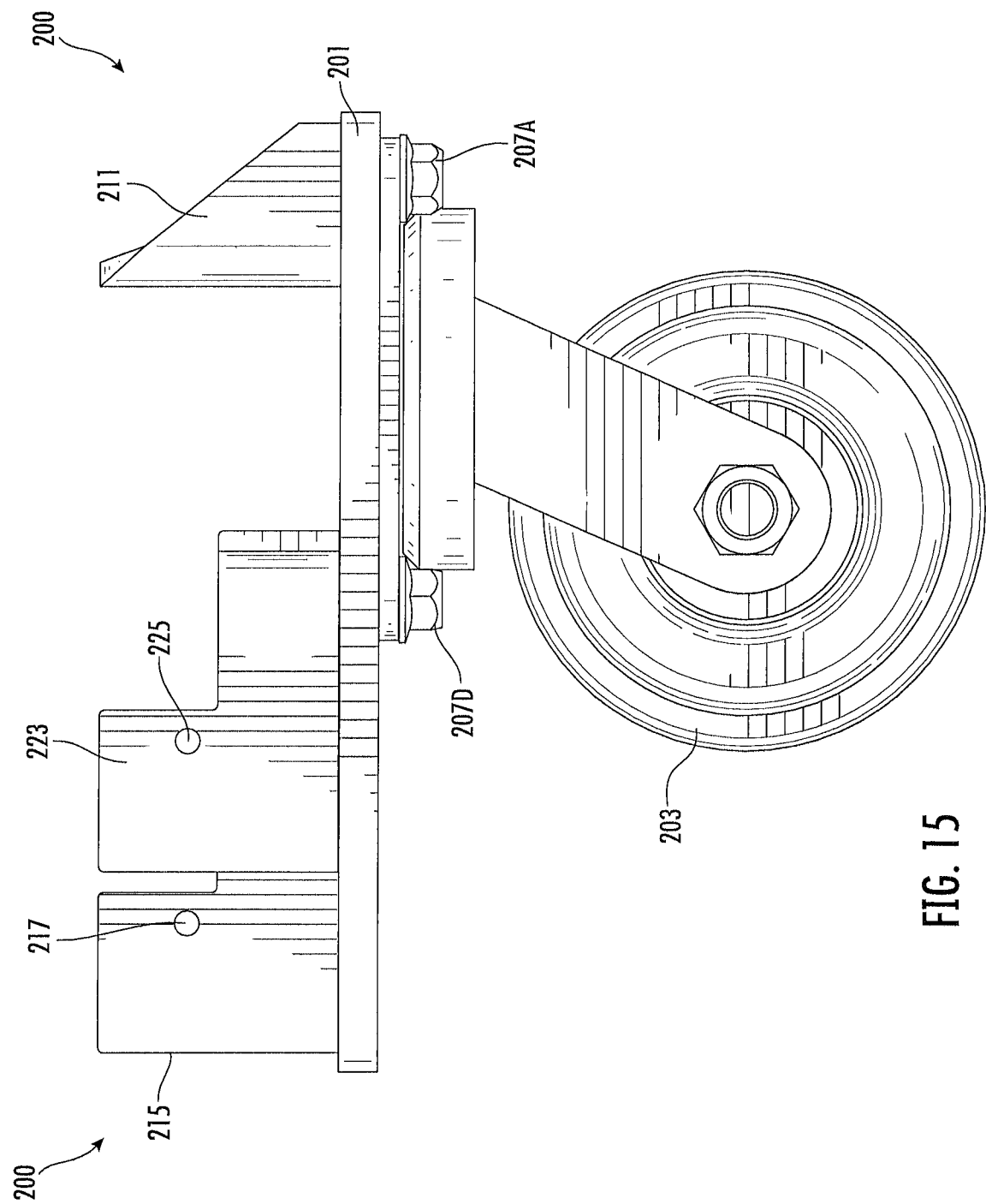
FIG. 15 is a side view of an alternative embodiment of an adjustable mounting caster plate from FIG. 13.
Figure 16:
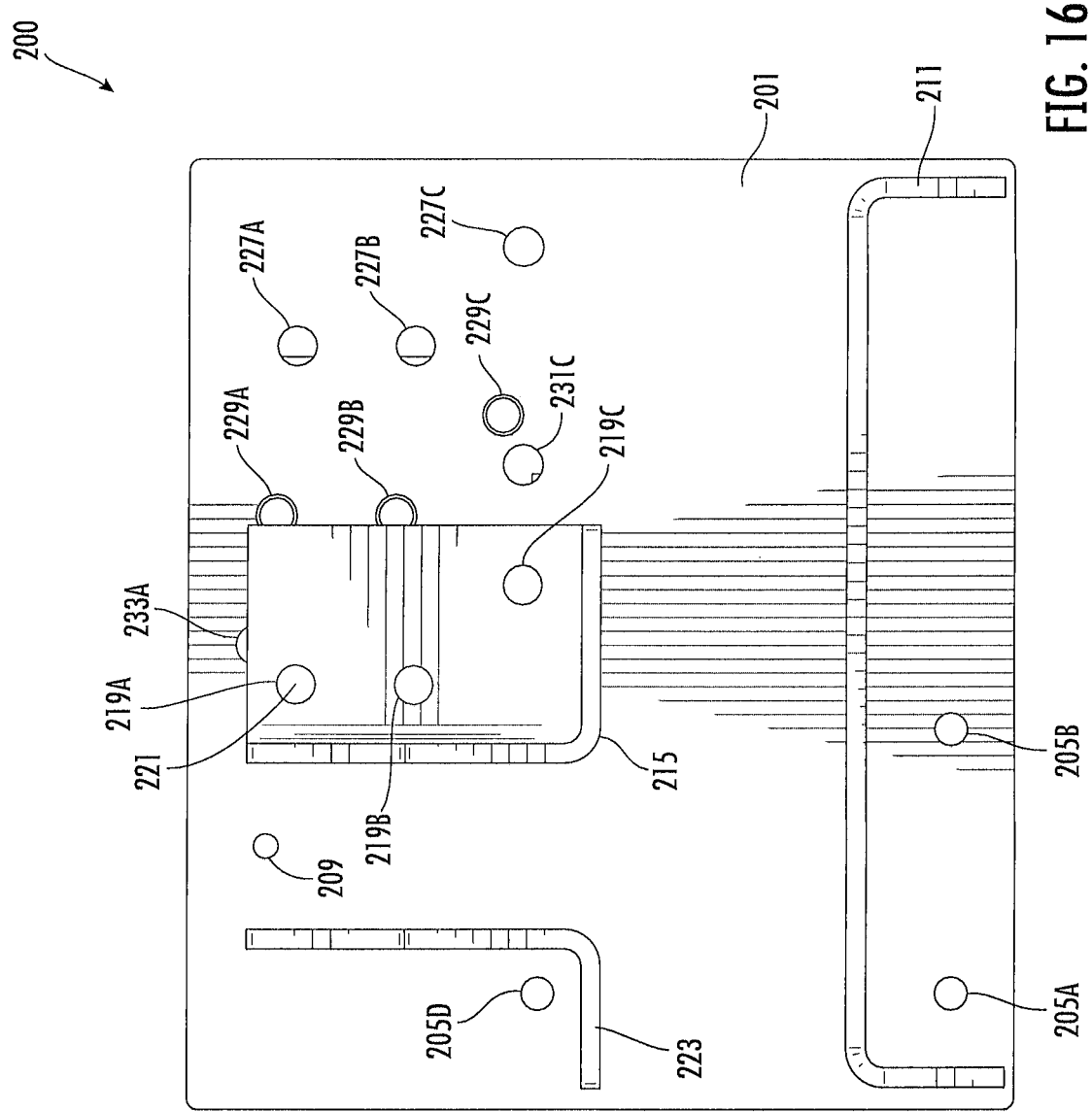
FIG. 16 is a top view of an alternative embodiment of an adjustable mounting caster plate from FIG. 13.
Figure 17:
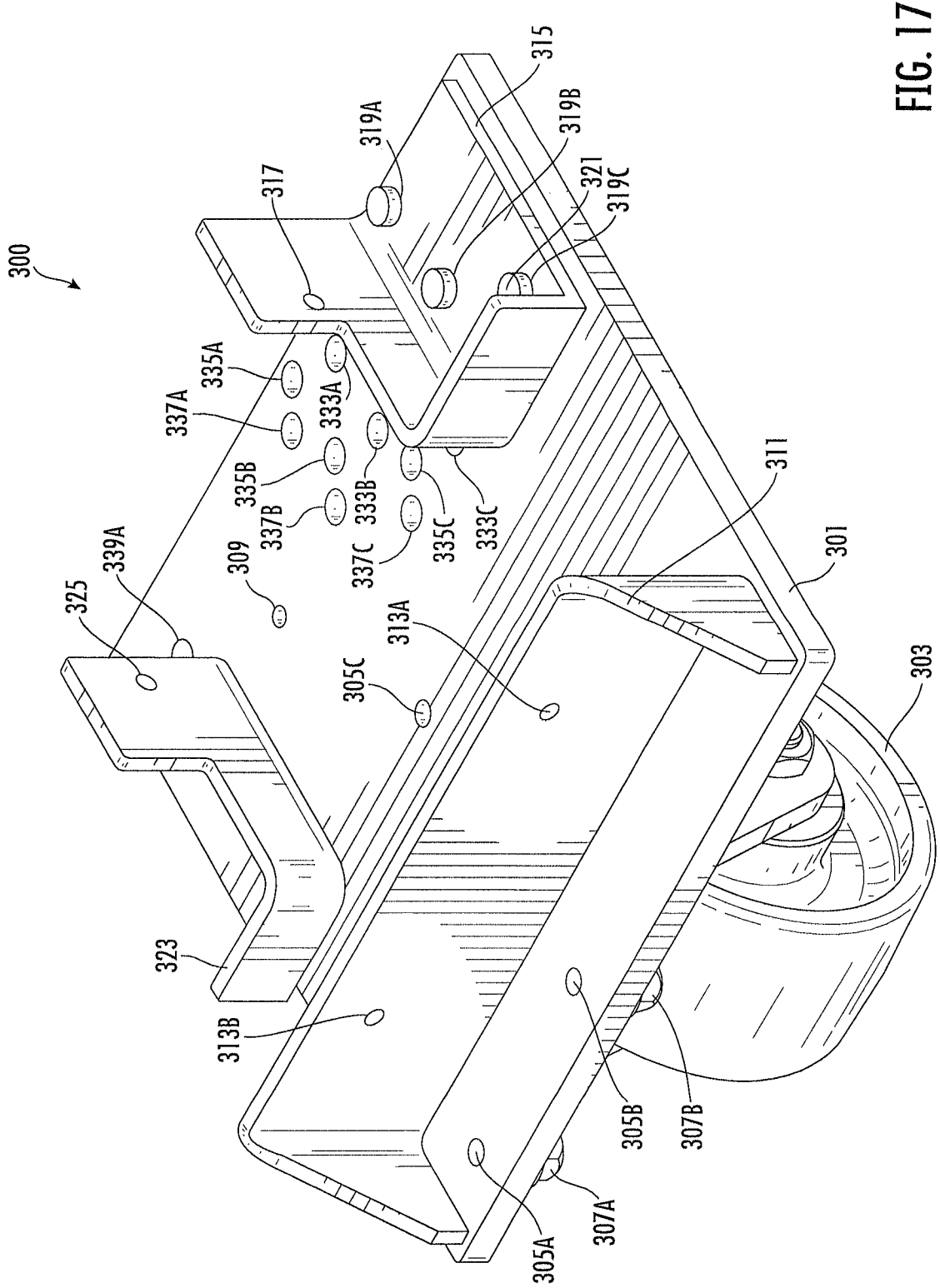
FIG. 17 is a perspective view of an adjustable mounting caster plate according to an alternative embodiment of the present application.
Figure 18:
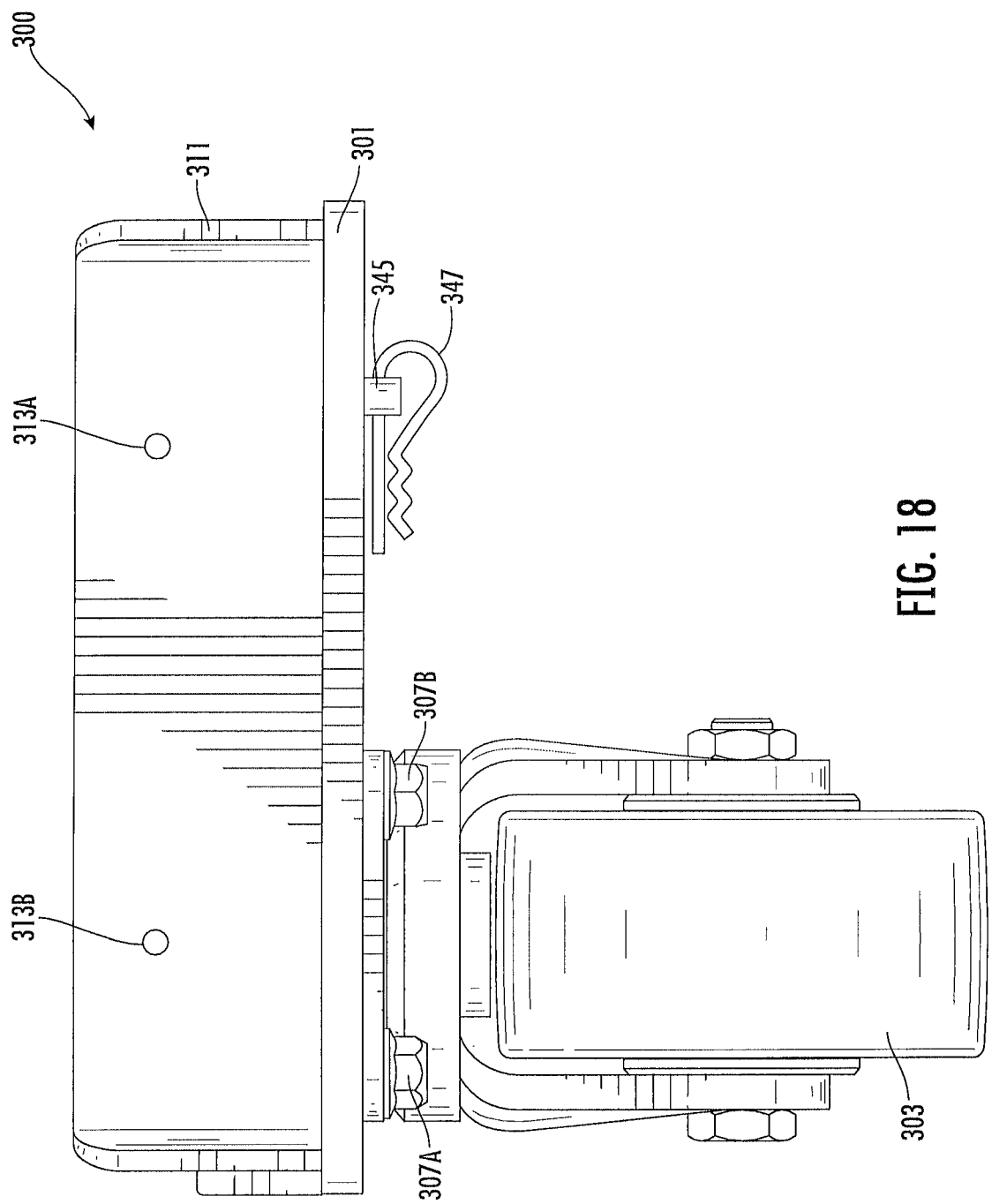
FIG. 18 is a front view of an alternative embodiment of an adjustable mounting caster plate from FIG. 17.
Figure 19:
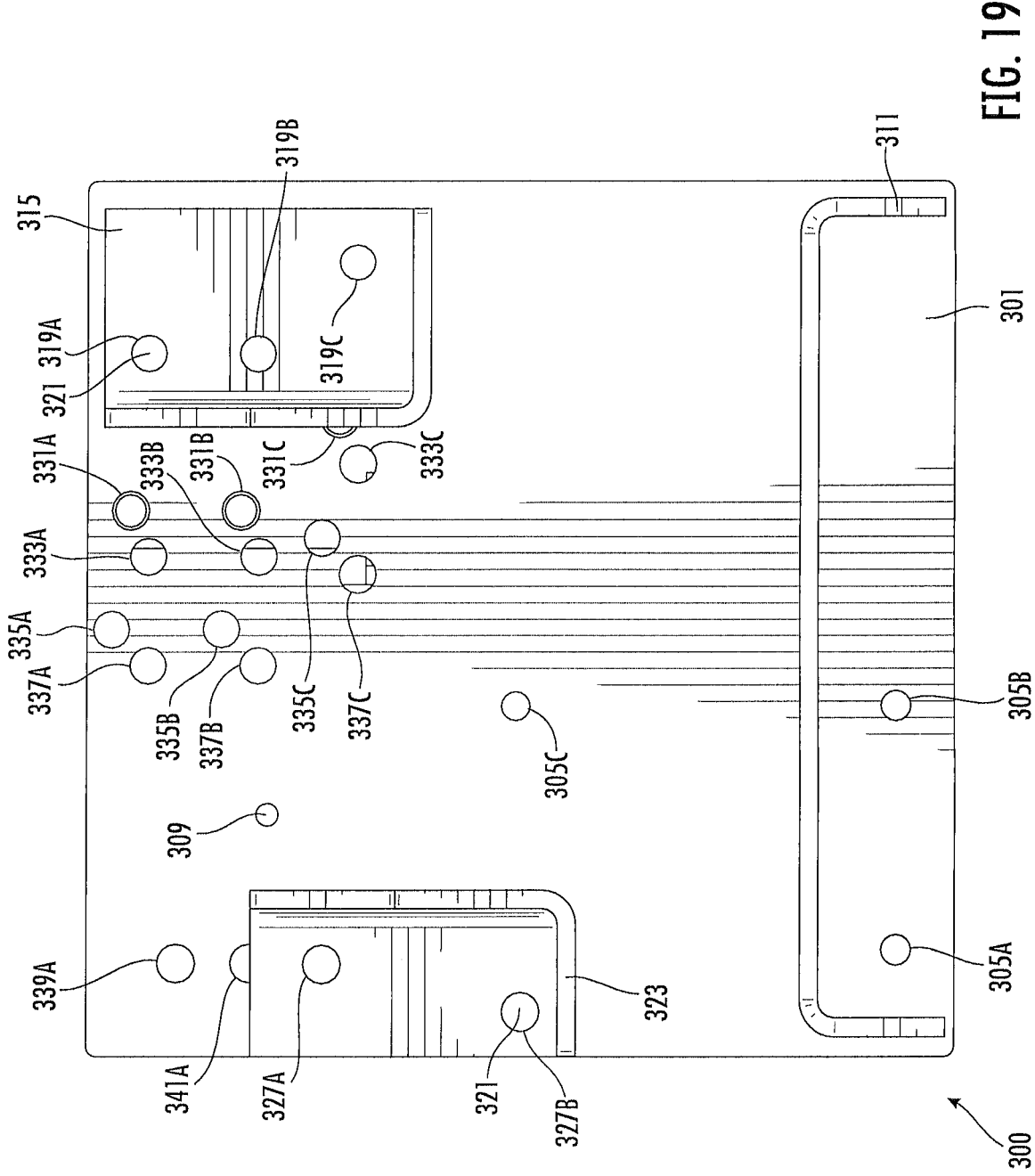
FIG. 19 is a top view of an alternative embodiment of an adjustable mounting caster plate from FIG. 17.
Figure 20:
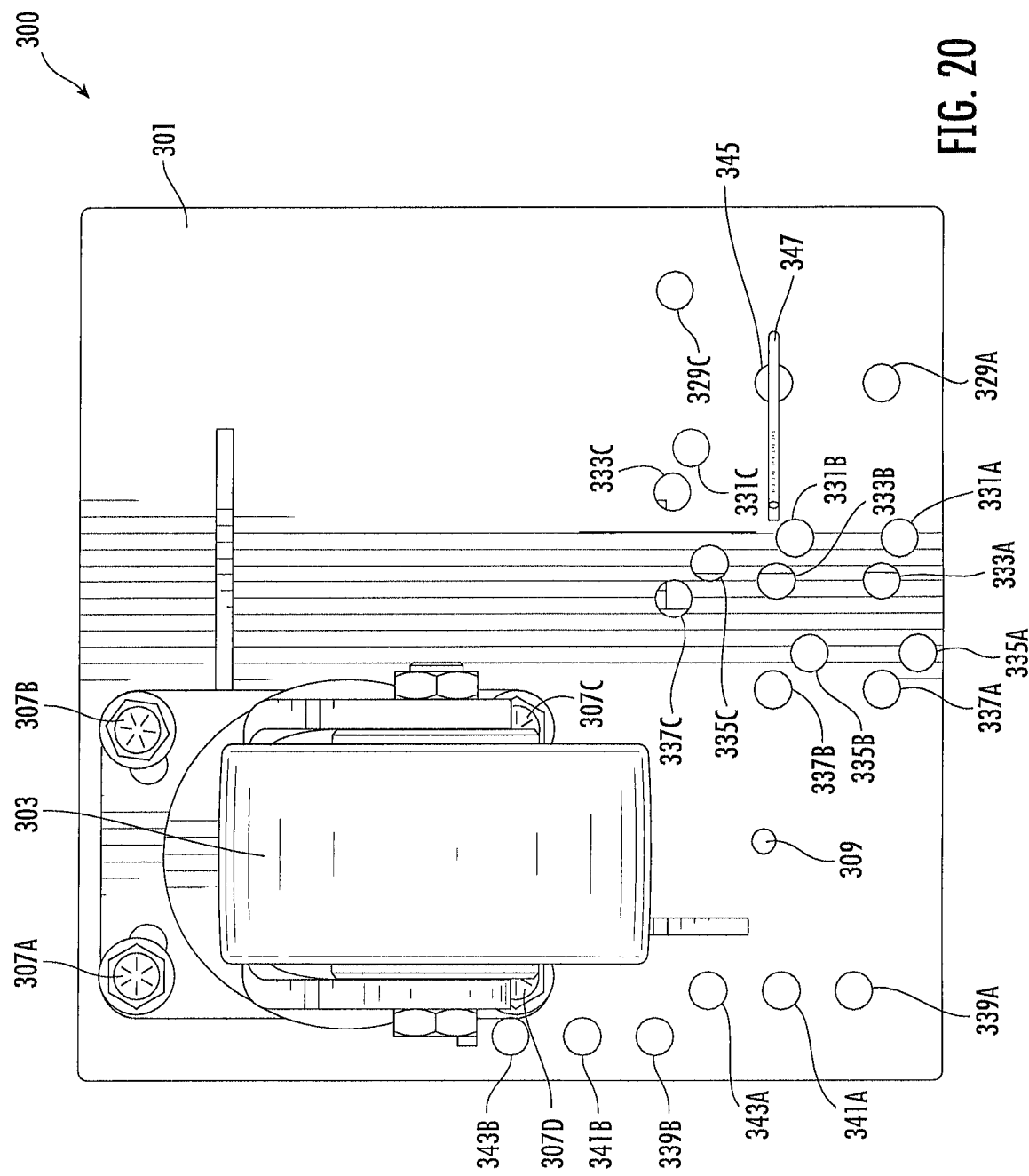
FIG. 20 is a bottom view of an alternative embodiment of an adjustable mounting caster plate from FIG. 17.

Opposite from the primary position apertures used for primary adjustable guide tab 115 are secondary guide tab first position apertures 139A-139B, secondary guide tab second position apertures 141A-141B, and secondary guide tab third position apertures 143A-143B which are each a series of two apertures used to secure secondary adjustable guide tab 123 to base plate 101. While the secondary position apertures serve the same function as the primary position apertures, the number of apertures used and the direction that the position apertures travel is different. While the current embodiment has three sets of secondary position apertures with each set having two apertures, alternative embodiments can also exist where there are more than three or less than three sets of secondary position apertures on base plate 101 and where each set can have more than two apertures or less than two apertures. Secondary position apertures are each a pair of two apertures which begin at the back left of base plate 101 with secondary guide tab first position apertures 139A-139B and continue towards the front left of base plate 101 ending with secondary guide tab third position apertures 143A-143B. Each of the secondary position apertures are a location where secondary adjustable guide tab 123 can be secured on the surface of base plate 101 as seen in FIGS. 6, 10, and 11. Secondary adjustable guide tab 123 will be secured to one of these positions depending on the width of the base board used for modular structure 1100 so that the base board will be secured between secondary adjustable guide tab 123 and mounting tab 111.

Secondary adjustable guide tab 123 has the same shape as primary adjustable guide tab 115 with a square base portion and two walls that protrude up from two sides of the base portion. While two upstanding walls are shown in the present application for secondary adjustable guide tab 123, it is appreciated that alternative embodiments can also exist where there is only one upstanding wall attached to the base portion or where there can be as many as four upstanding walls enclosing the base portion of guide tab 123. Within the base portion of secondary adjustable guide tab 123 there are primary guide tab pin holes 127A-127B which are two holes positioned to match the shape and pattern of the series of secondary position apertures in base plate 101. While the current embodiment of secondary guide tab pin holes 127A-127B use two holes, alternative embodiments can also exist where there are more than two pin holes or less than two pin holes to match the amount of secondary position apertures in base plate 101. The base portion of guide tab 123 further has pins 121 inserted through and secured within pin holes 127A-127B either by welding or fasteners. As seen in the current embodiment, the top of pins 121 protrude up from the base portion of guide tab 123 once inserted, however, alternative embodiments exist where the tops of pins 121 are removed to have pins 121 flush with the surface of the base portion of guide tab 123.

Once fastened to secondary adjustable guide tab 123, pins 121 extend down from the base portion of guide tab 123 and function as the coupling mechanism for securing guide tab 123 to base plate 101. When securing secondary adjustable guide tab 123 to base plate 101, pins 121 will be positioned over the desired secondary position apertures such that pins 121 will be aligned with the position apertures. Once aligned, pins 121 are inserted through the position apertures securing secondary adjustable guide tab 123 to the surface of base plate 101. When pins 121 are inserted, pins will be flush with the lower surface of base plate 101, however, other embodiments can exist where longer pins 121 are used which extend beyond the lower surface of base plate 101. Secondary adjustable guide tab 123 further has secondary guide tab fastening hole 125 through the upstanding wall of tab 123 which is a location where a screw, nail, or other fastener can be inserted to connect guide tab 123 to a base board of modular structure 1100 when in use.

Also located on the surface of base plate 101 is mounting tab 111. In the preferred embodiment, mounting tab 111 is not adjustable and instead is secured at the front of base plate 101 and welded in place. However, alternative embodiments can also exist where mounting tab 111 is adjustable and can be removed from the surface of base plate 101. Mounting tab 111 functions as a stable mounting spot for securing the base of modular structure 1100 to adjustable caster mounting plate 100. Mounting tab 111 is a rectangular section of material extending up from base plate 101. On either side of mounting tab 111, the sides of tab 111 curve down towards the front surface of base plate 101 extending down to form a c-channel structure. The c-channel structure increases the number of points of contact between base plate 101 and mounting tab 111 which increases the stability of mounting tab 111 and adjustable caster mounting plate 100 when in use. Bored through the surface of mounting tab 111 there are mounting tab fastening holes 113A and 113B which are locations where screws, nails, or other fasteners can be inserted to mounting tab 111 to a base board of modular structure 1100 when in use.

Once primary adjustable guide tab 115 and secondary adjustable guide tab 123 are secured in a desired location, the base of modular structure 1100 is attached to adjustable caster mounting plate 100. When tabs 115 and 123 are in position, two channels are formed that a base board can be inserted into, the channel formed between primary adjustable guide tab 115 and secondary adjustable guide tab 123 and the channel formed between secondary adjustable guide tab 123 and mounting tab 111. It is also appreciated that guide tabs 115 and 123 will not always be used and that in those scenarios mounting tab 111 will be the only point of contact connecting adjustable caster mounting plate 100 to modular structure 1100. When inserted through the first channel produced by guide tabs 115 and 123, the base board will be pushed through the channel until the base board is stopped by mounting tab 111. When the base of modular structure 1100 is positioned against mounting tab 111, screws or other fasteners can be inserted through mounting tab fastening holes 113A-113B in the surface of mounting tab 111. Base plate 101 further has plate fastening hole 109 at the back of base plate 101 between adjustable guide tabs 115 and 123 which provides another location for fasteners to be inserted for securing the base of modular structure 1100 to the surface of base plate 101. These fastening positions will work together to secure modular structure 1100 in place on adjustable caster mounting plate 100 when moving modular structure 1100 to a desired location.

Referring now also to FIGS. 13-16 in the drawings, varying views of alternative embodiment adjustable caster mounting plate 200 are depicted. Alternative adjustable caster mounting plate 200 is comprised of base plate 201, caster assembly 203, apertures 205A-205D, caster fasteners 207A-207D, plate fastening hole 209, mounting tab 211, mounting tab fastening holes 213A-213B, primary adjustable guide tab 215, primary guide tab fastening hole 217, primary guide tab pin holes 219A-219C, pin 221, secondary guide tab 223, secondary guide tab fastening hole 225, primary guide tab first position apertures 227A-227C, primary guide tab second position apertures 229A-229C, primary guide tab third position apertures 231A-231C, primary guide tab fourth position apertures 233A-233C, and primary guide tab fifth position apertures 235A-235C. The structure and functionality of adjustable caster mounting plate 200 has the same structure and functionality of adjustable caster mounting plate 100 except that secondary guide tab 223 is not adjustable. Secondary guide tab 223 is welded or fastened directly to the surface of base plate 201 which increases the stability of guide tab 223 when attached to a base board but lowers the versatility of use for secondary guide tab 223. While primary adjustable guide tab 215 can still be adjusted to accommodate base boards with different widths, the distance between secondary guide tab 223 and mounting tab 211 will stay consistent.

Referring now to FIGS. 17-20 in the drawings, varying views of alternative embodiment adjustable caster mounting plate 300 are depicted. Alternative adjustable caster mounting plate 300 is comprised base plate 301, caster assembly 303, apertures 305A-305D, caster fasteners 307A-307D, plate fastening hole 309, mounting tab 311, mounting tab fastening holes 313A-313B, primary adjustable guide tab 315, primary guide tab fastening hole 317, primary guide tab pin holes 319A-319C, pin 321, secondary adjustable guide tab 323, secondary guide tab fastening hole 325, secondary guide tab pin hole 327A-327B, primary guide tab first position apertures 329A-329C, primary guide tab second position apertures 331A-331C, primary guide tab third position apertures 333A-333C, primary guide tab fourth position apertures 335A-335C, primary guide tab fifth position apertures 337A-337C, secondary guide tab first position apertures 339A-339B, secondary guide tab second position apertures 341A-341B, secondary guide tab third position apertures 343A-343B, extended pin length 345, and cotter pin 347. Mounting plate 300 has the same structure and functionality as mounting plate 100 of the preferred embodiment, however, mounting plate 300 further has extended pin length 345 and cotter pin 347. Pins 321 in adjustable caster mounting plate 300 have extended pin length 345 protruding out the bottom of base plate 301. When pins 321 are inserted through the desired position hole in base plate 301, a cotter pin 347 is inserted through extended pin length 345 locking pin 321 in place. While only a singular extended pin length 345 is shown in the present application, it is appreciated that more than one pin 321 can have extended pin length 345 with cotter pin 347 for securing every pin 321 in place when adjustable caster mounting plate 300 is in use.

Figure 21:
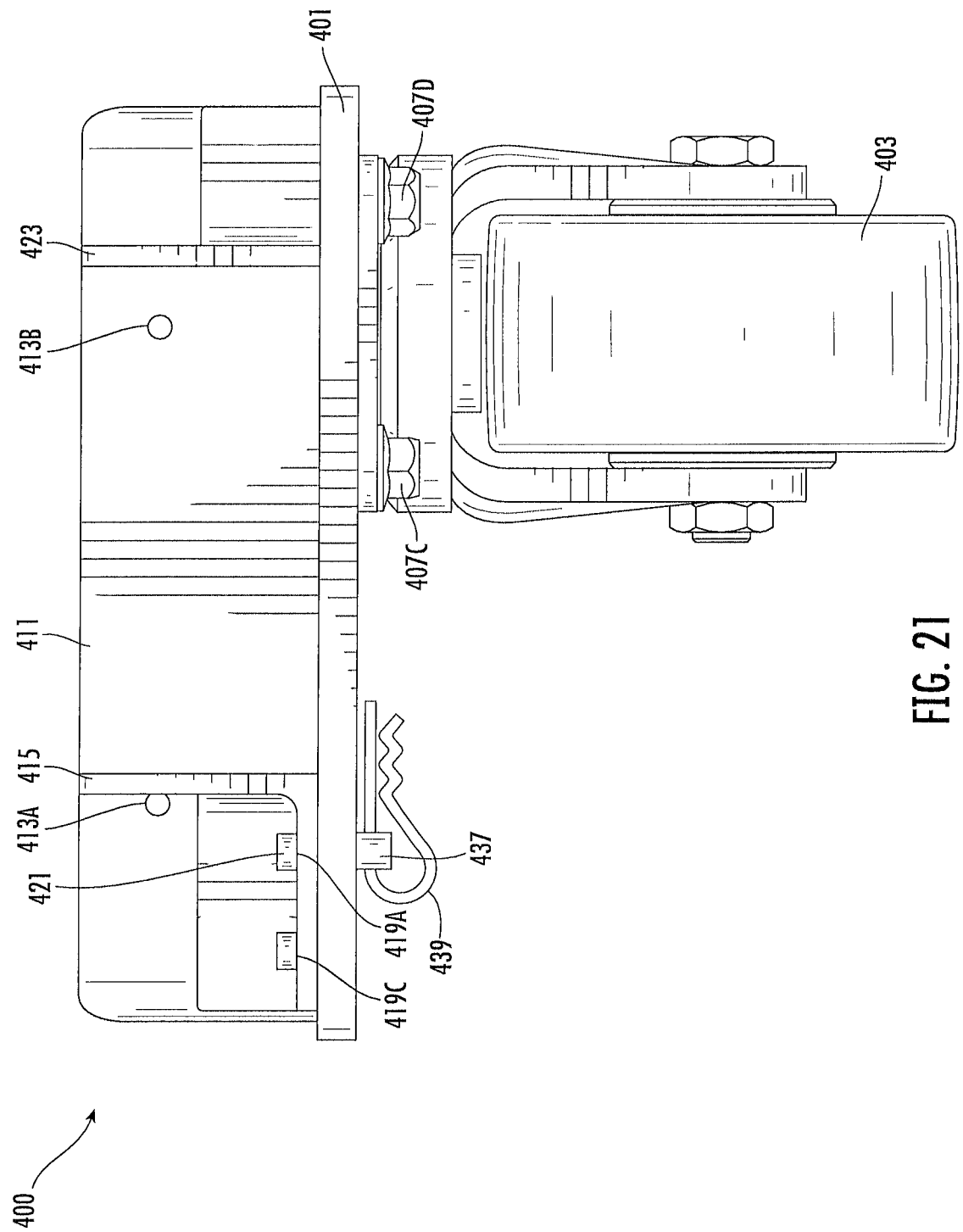
FIG. 21 is a back view of an adjustable mounting caster plate according to an alternative embodiment of the present application.
Figure 22:
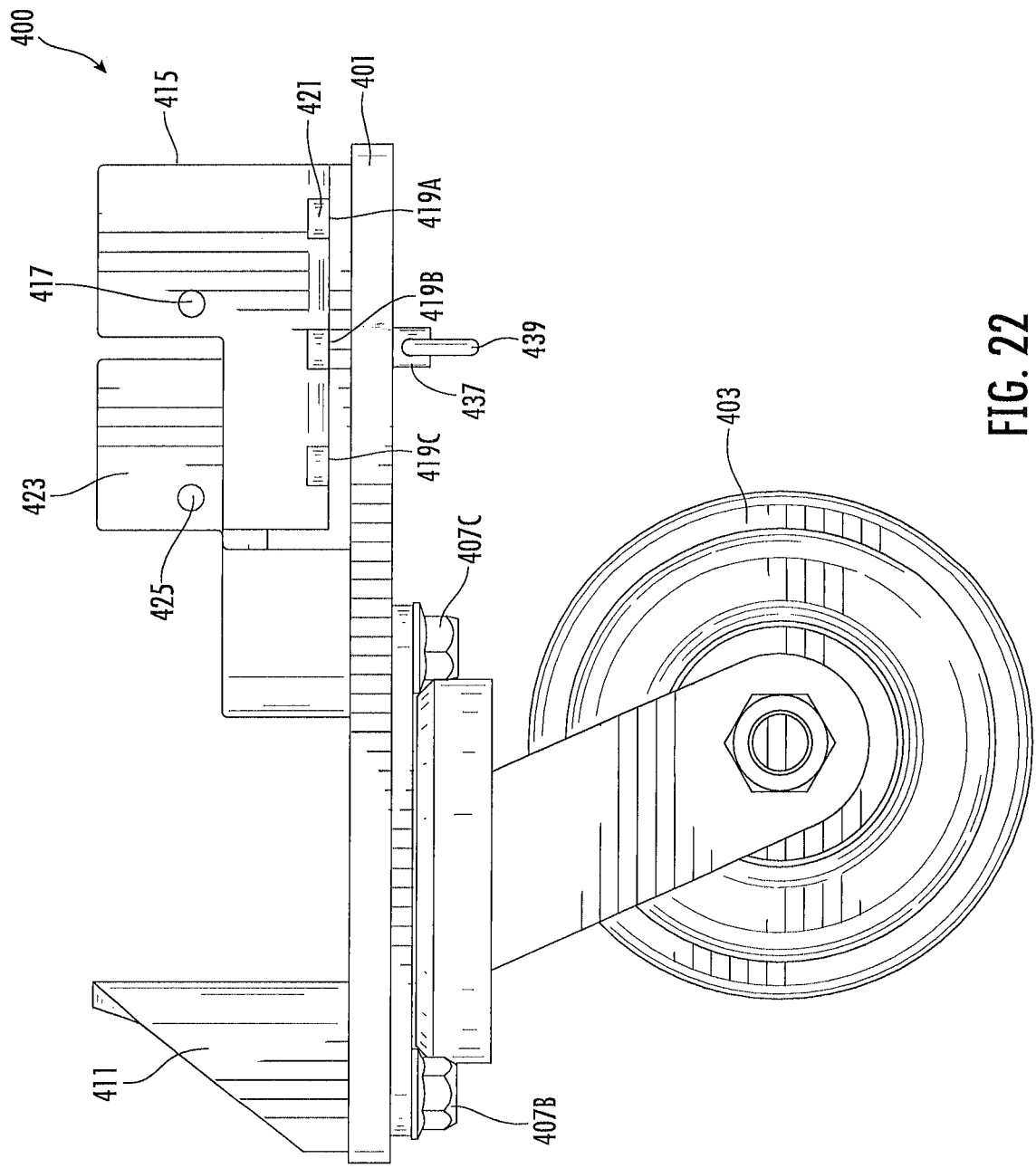
FIG. 22 is a side view of an alternative embodiment of an adjustable mounting caster plate from FIG. 21.
Figure 23:
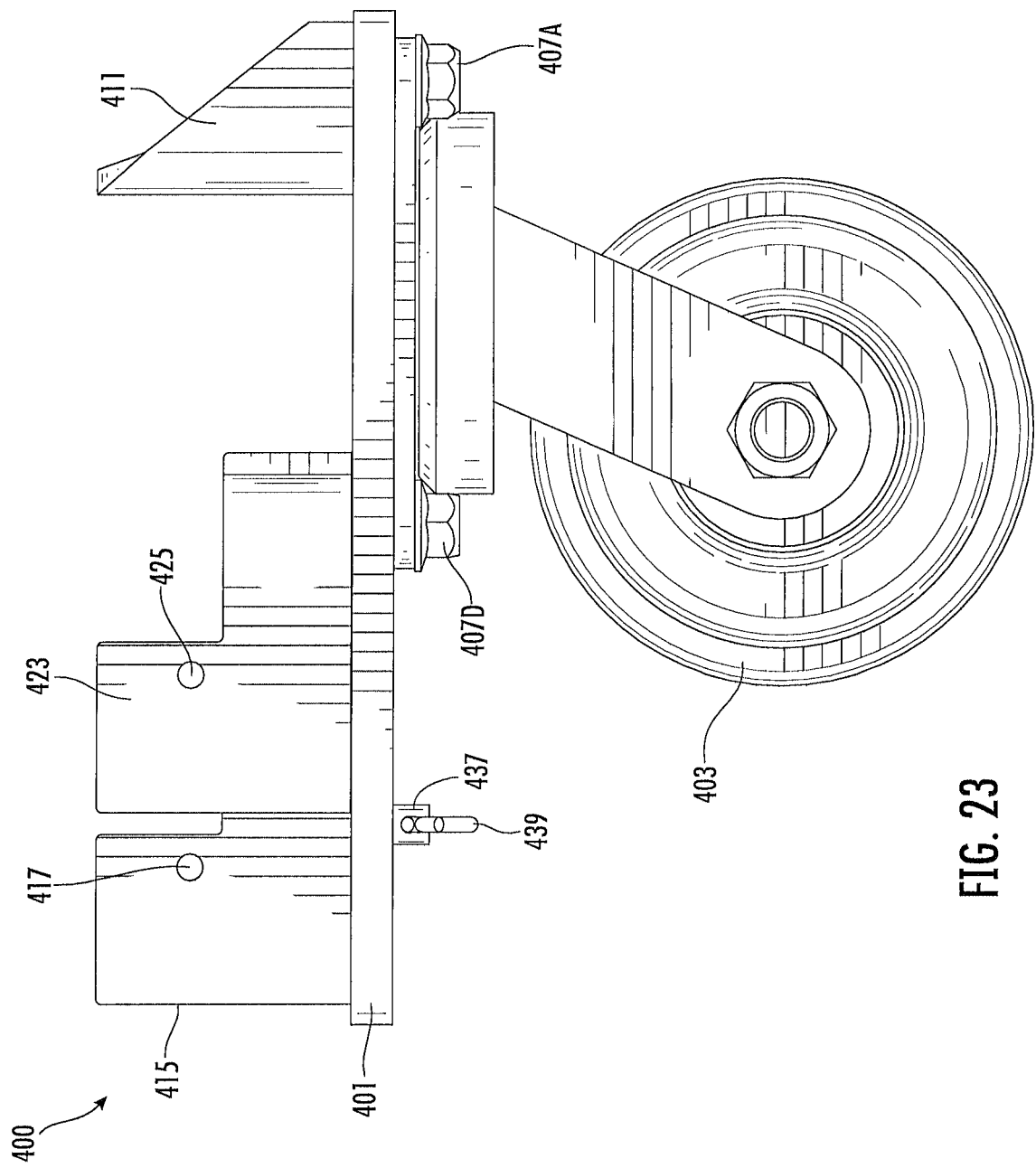
FIG. 23 is a side view of an alternative embodiment of an adjustable mounting caster plate from FIG. 21.
Figure 24:
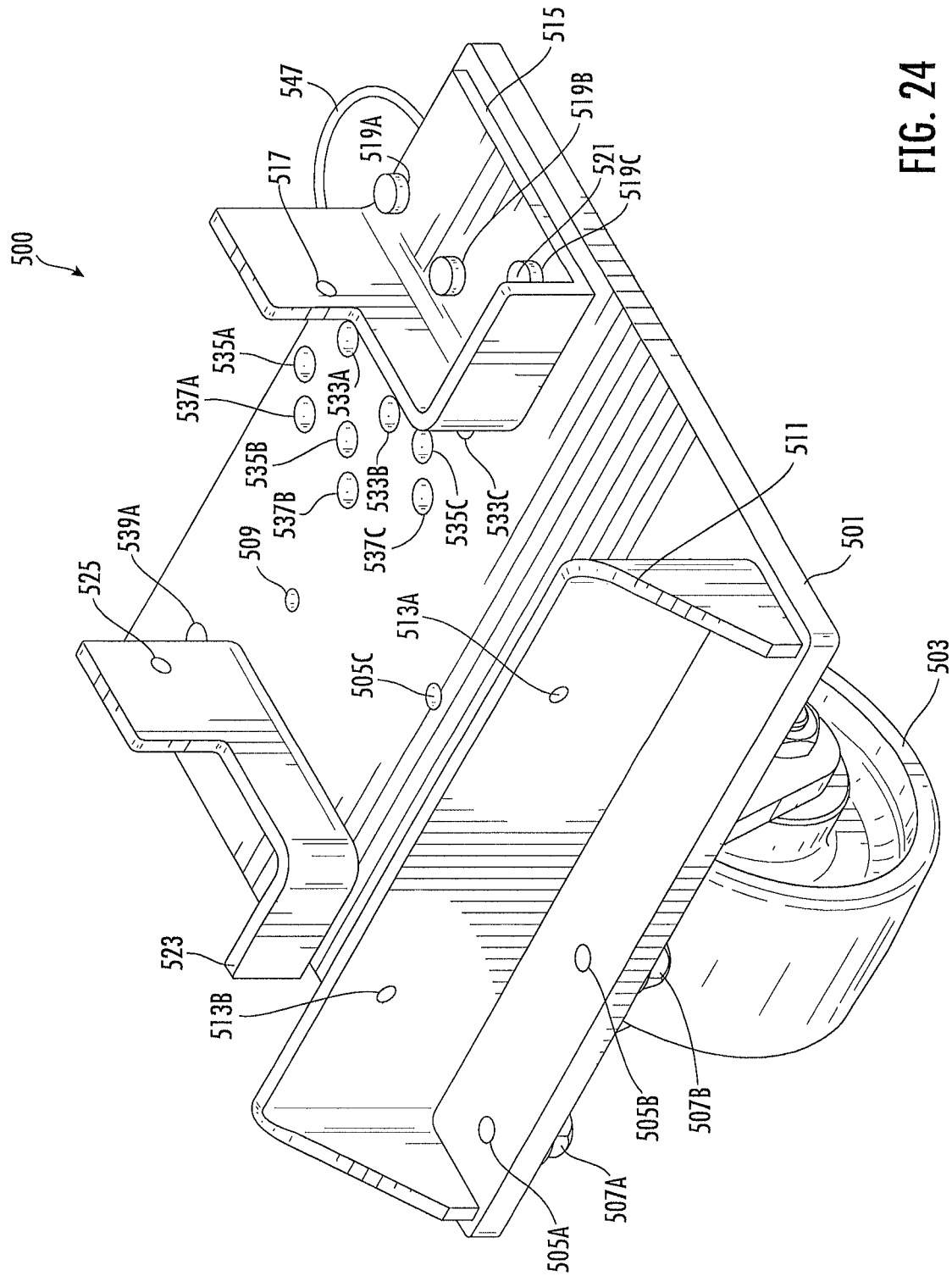
FIG. 24 is a perspective view of an adjustable mounting caster plate according to an alternative embodiment of the present application.
Figure 25:
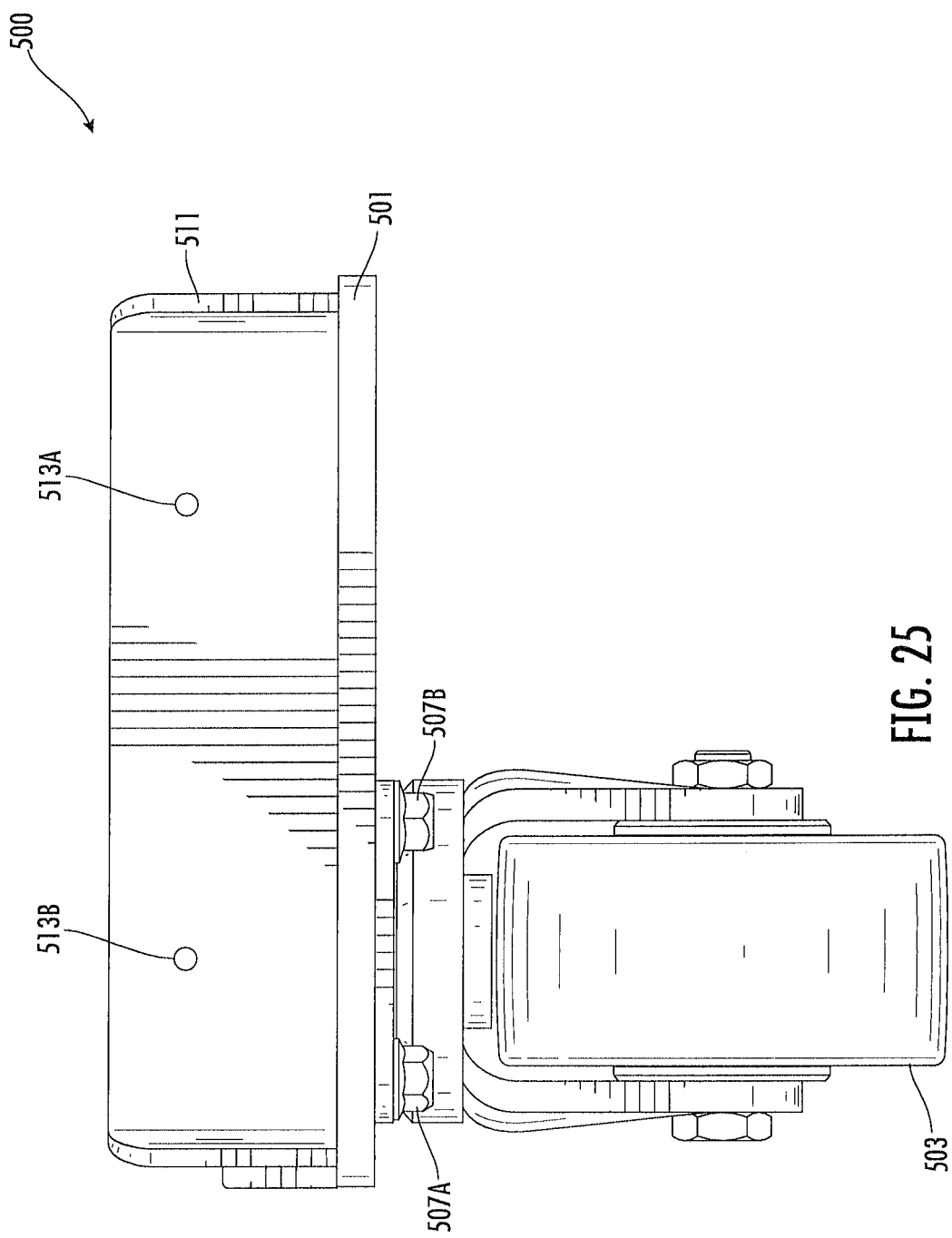
FIG. 25 is a front view of an alternative embodiment of an adjustable mounting caster plate from FIG. 24.
Figure 26:
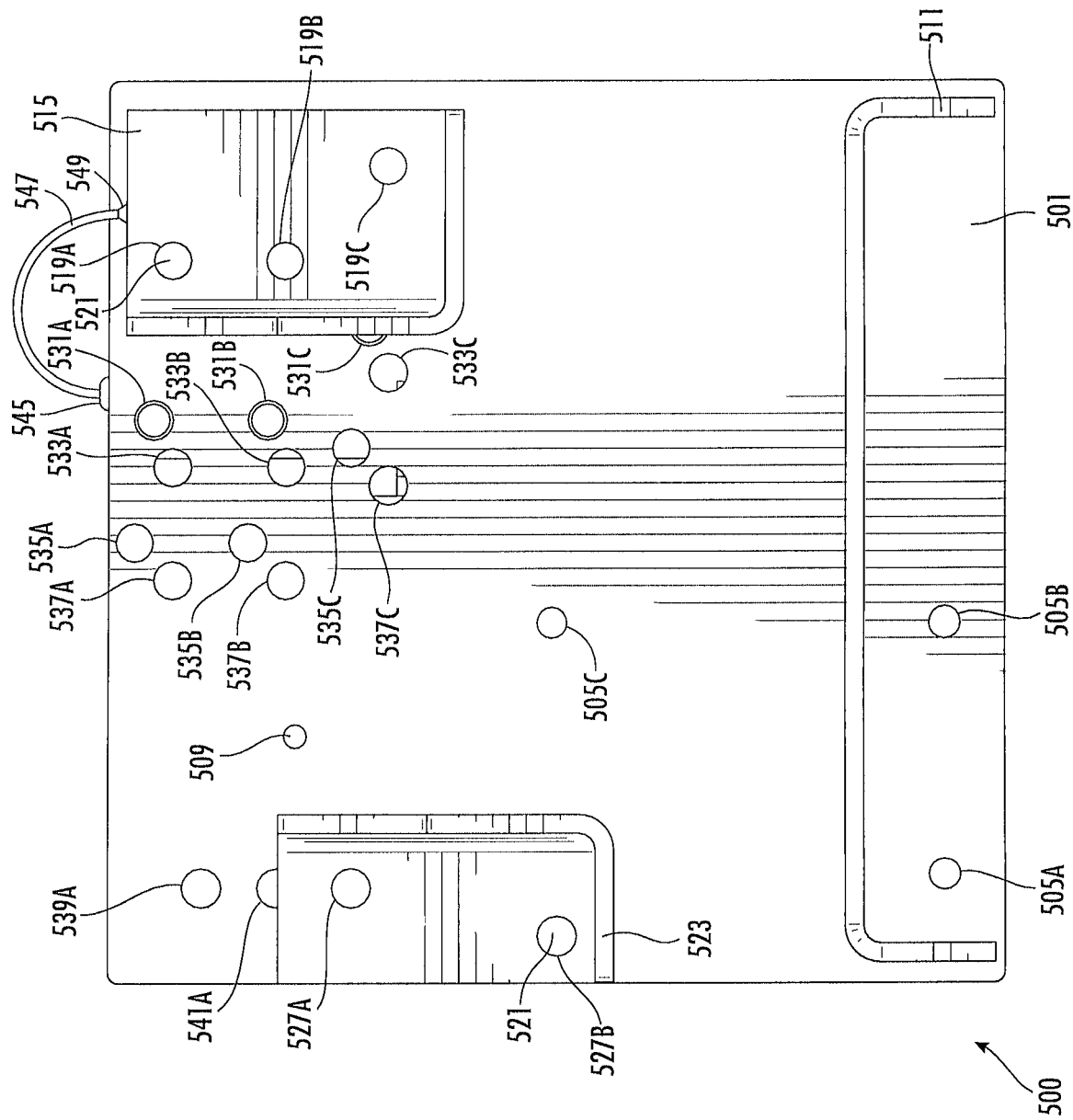
FIG. 26 is a top view of an alternative embodiment of an adjustable mounting caster plate from FIG. 24.
Figure 27:
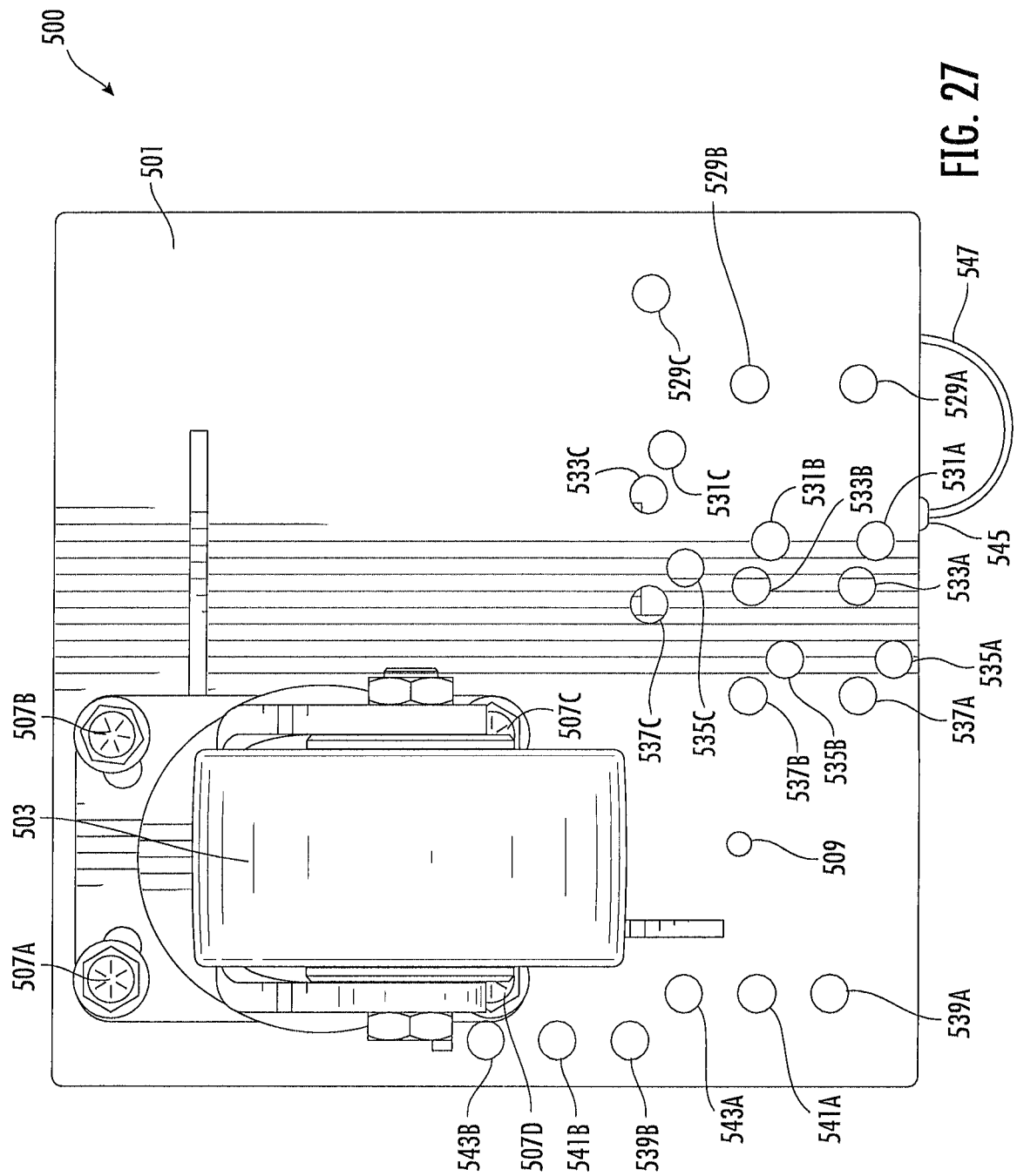
FIG. 27 is a bottom view of an alternative embodiment of an adjustable mounting caster plate from FIG. 24.

Referring now also to FIGS. 21-23 in the drawings, varying views of an alternative embodiment adjustable caster mounting plate 400 are depicted. Alternative adjustable caster mounting plate 400 is comprised of base plate 401, caster assembly 403, apertures 405A-405D, caster fasteners 407A-407D, plate fastening hole 409, mounting tab 411, mounting tab fastening holes 413A-413B, primary adjustable guide tab 415, primary guide tab fastening hole 417, primary guide tab pin hole 419A-419C, pin 421, secondary guide tab 423, secondary guide tab fastening hole 425, primary guide tab first position apertures 427A-427C, primary guide tab second position apertures 429A-429C, primary guide tab third position apertures 431A-431C, primary guide tab fourth position apertures 433A-433C, primary guide tab fifth position apertures 435A-435C, extended pin length 437, and cotter pin 439. The structure and functionality of adjustable caster mounting plate 400 has the same structure and functionality of adjustable caster mounting plate 300 except that secondary guide tab 423 is not adjustable. Secondary guide tab 423 is welded or fastened directly to the surface of base plate 401 which increases the stability of guide tab 423 when attached to a base board but lowers the versatility of use for secondary guide tab 423. While primary adjustable guide tab 415 can still be adjusted to accommodate base boards with different widths, the distance between secondary guide tab 423 and mounting tab 411 will stay consistent.

Referring now to FIGS. 24-27 in the drawings, varying views of an alternative embodiment adjustable caster mounting plate 500 are depicted. Alternative adjustable caster mounting plate 500 is comprised base plate 501, caster assembly 503, apertures 505A-505D, caster fasteners 507A-507D, plate fastening hole 509, mounting tab 511, mounting tab fastening holes 513A-513B, primary adjustable guide tab 515, primary guide tab fastening hole 517, primary guide tab pin hole 519A-519C, pin 521, secondary adjustable guide tab 523, secondary guide tab fastening hole 525, secondary guide tab pin hole 527A-527B, primary guide tab first position apertures 529A-529C, primary guide tab second position apertures 531A-531C, primary guide tab third position apertures 533A-533C, primary guide tab fourth position apertures 535A-535C, primary guide tab fifth position apertures 537A-537C, secondary guide tab first position apertures 539A-539B, secondary guide tab second position apertures 541A-541B, secondary guide tab third position apertures 543A-543B, plate attachment point 545, connector 547, and guide tab attachment point 549. Mounting plate 500 has the same structure and functionality as mounting plate 100 of the preferred embodiment, however, mounting plate 500 further has plate attachment point 545, connector 547, and guide tab attachment point 549. In the drawings, plate attachment point 545 is connected to the back side of mounting plate 511 and guide tab attachment point 549 is connected to the back of primary adjustable guide tab 515 with connector 547 coupling these two attachment points. However, alternative embodiments also exist where there is another series of attachment points 545 and 549 with a connector 547 coupling mounting plate 511 and secondary adjustable guide tab 523. Alternative embodiments also exist where the location of plate attachment point 545 is on the side of base plate 501 instead of the back of base plate 501. Attachment points 545 and 549 and connector 547 work in tandem to secure guide tabs 515 and 523 to the surface of base plate 501 so that tabs 515 and 523 do not get removed when adjustable caster mounting plate 500 is in use. These features work in connection with pins 521 to lock in and secure adjustable guiding tabs 515 and 523.

Figure 28:
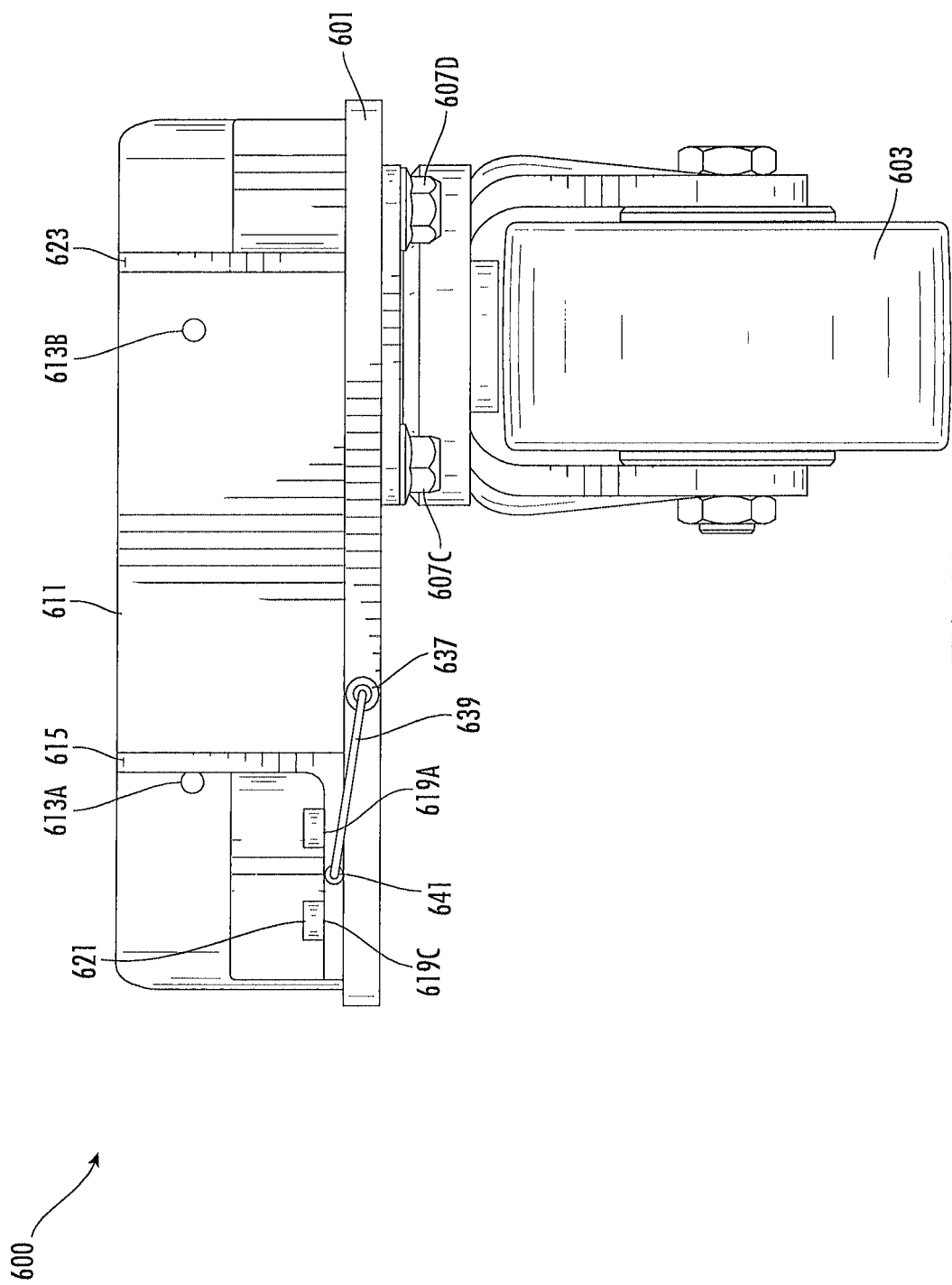
FIG. 28 is a back view of an adjustable mounting caster plate according to an alternative embodiment of the present application.
Figure 29:
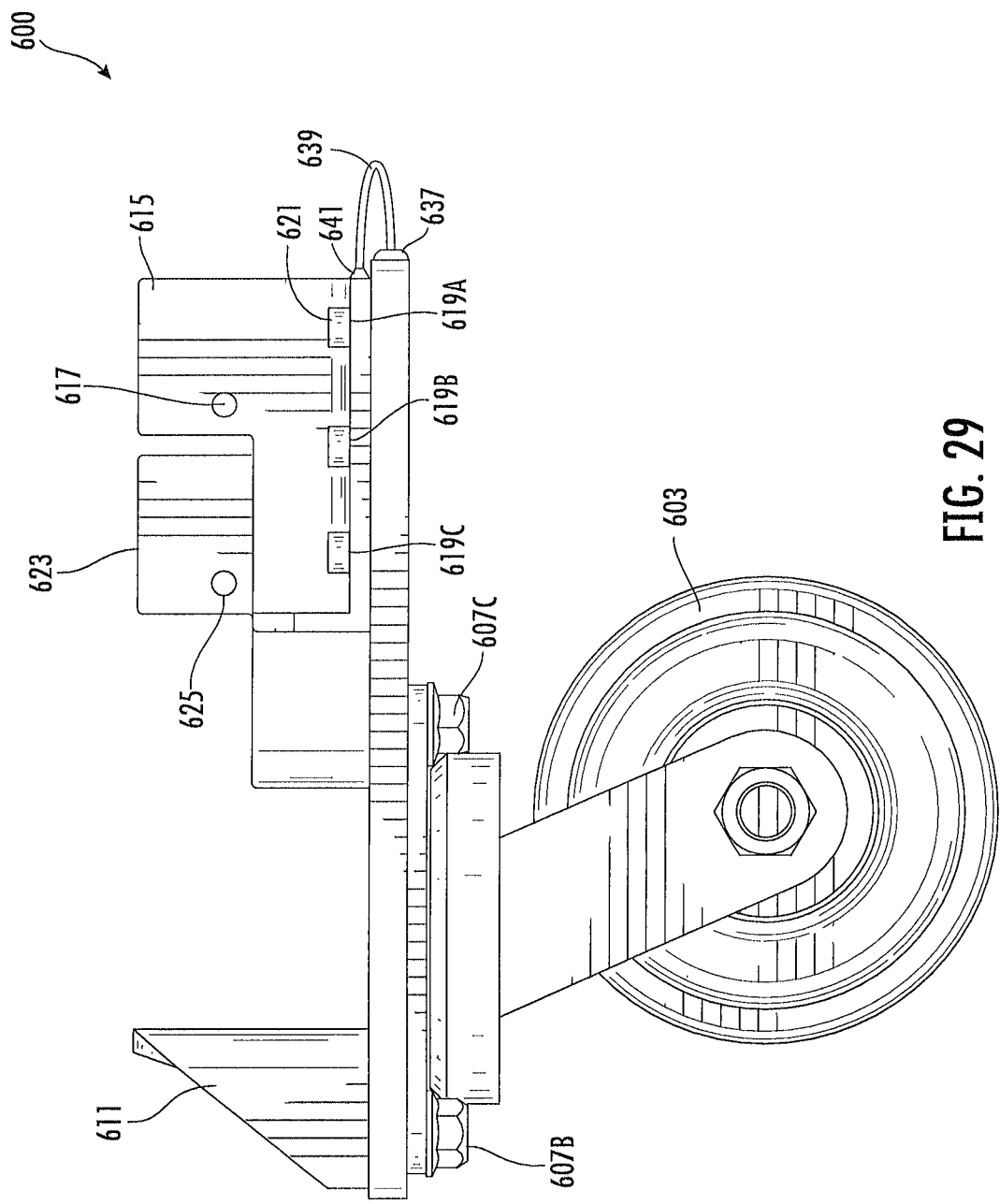
FIG. 29 is a side view of an alternative embodiment of an adjustable mounting caster plate from FIG. 28.
Figure 30:
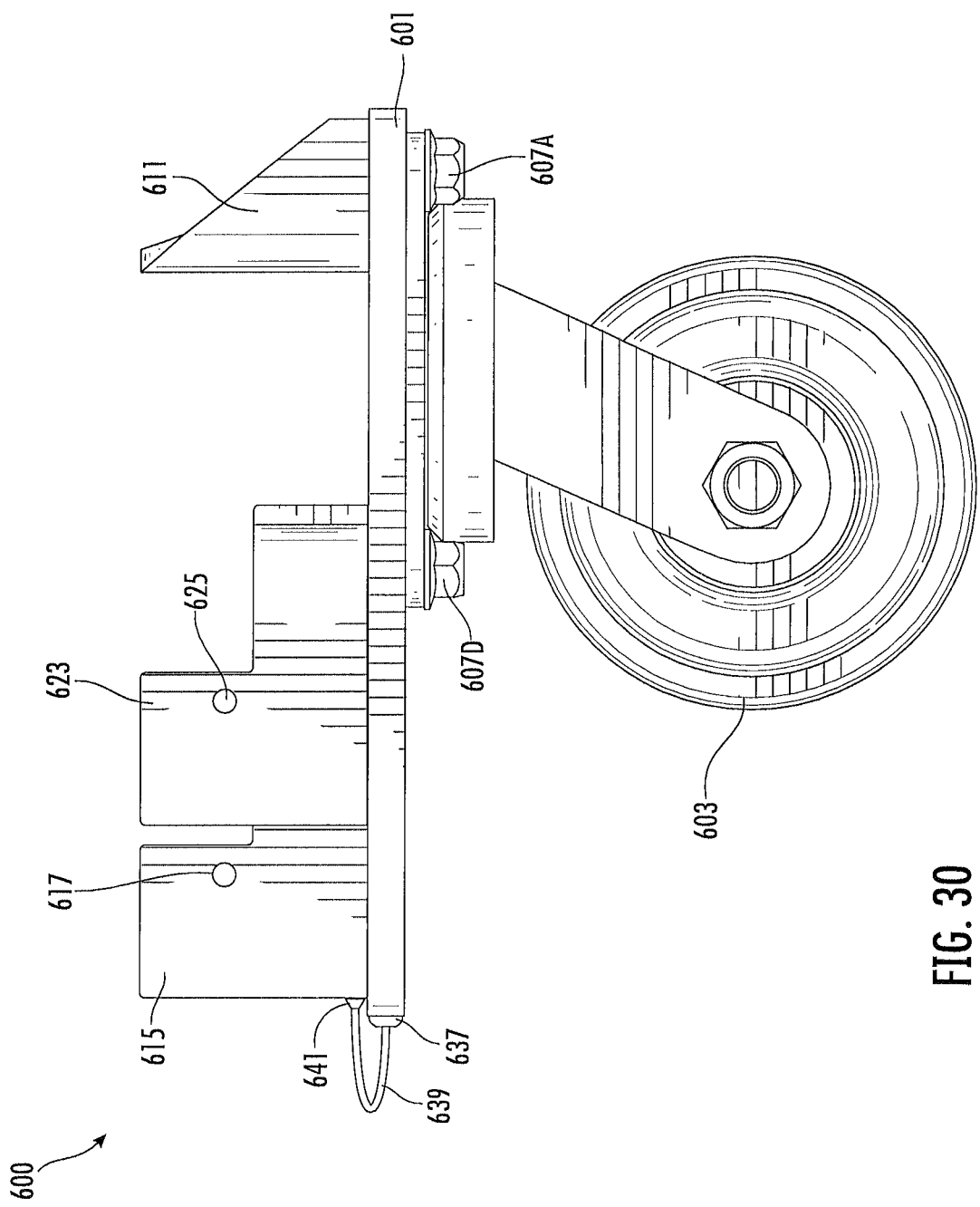
FIG. 30 is a side view of an alternative embodiment of an adjustable mounting caster plate from FIG. 28.
Figure 31:
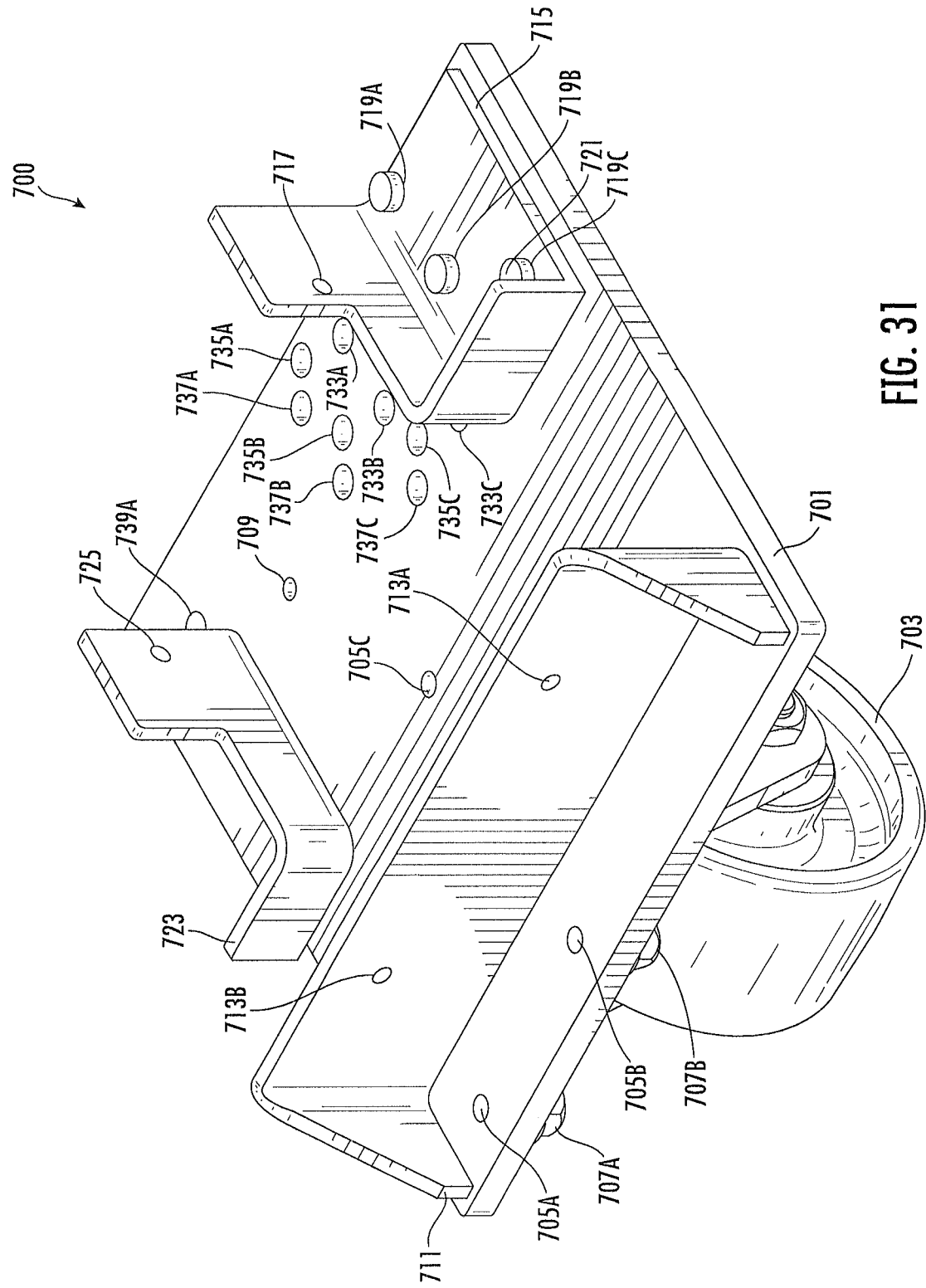
FIG. 31 is a perspective view of an adjustable mounting caster plate according to an alternative embodiment of the present application.
Figure 32:
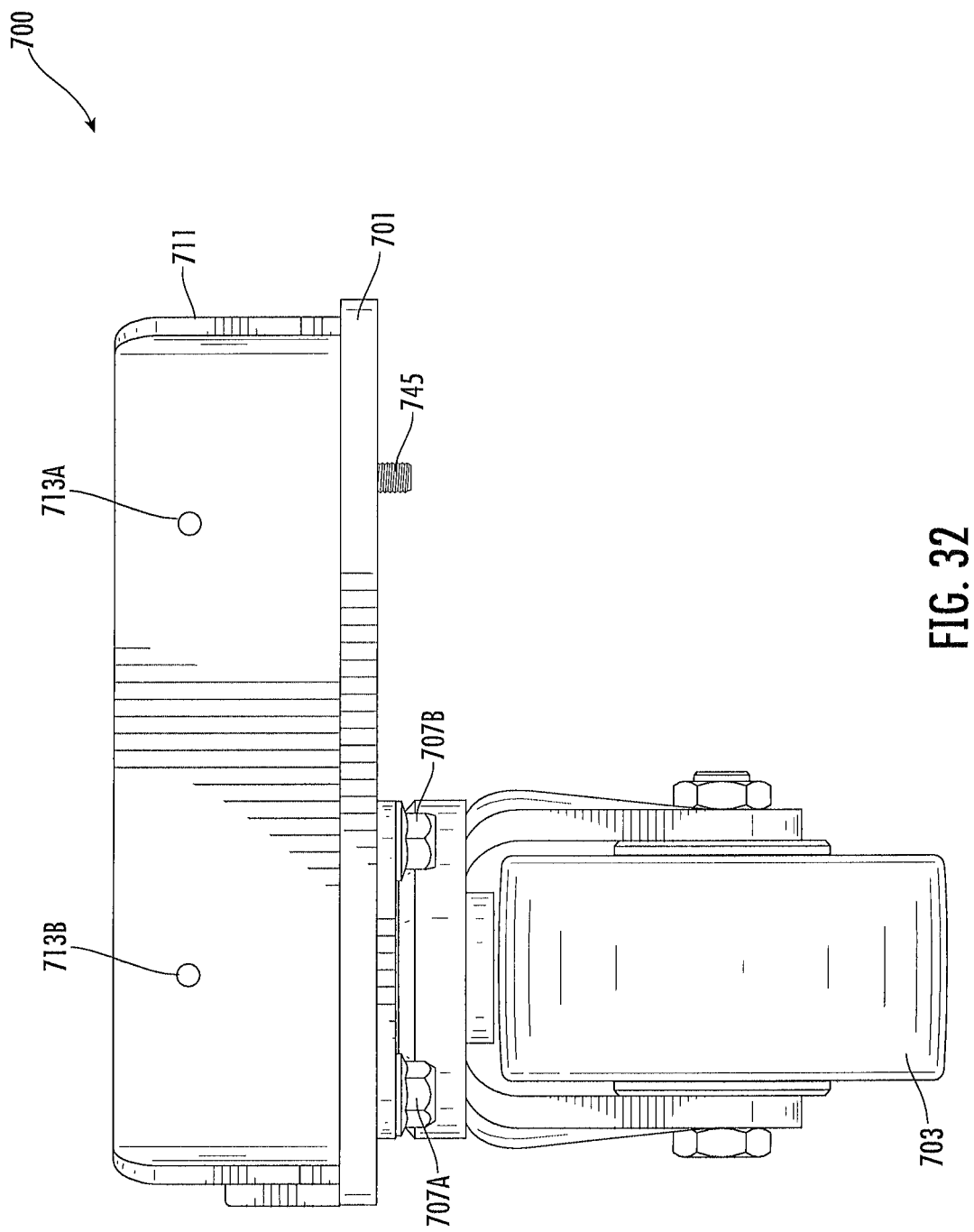
FIG. 32 is a front view of an alternative embodiment of an adjustable mounting caster plate from FIG. 31.
Figure 33:
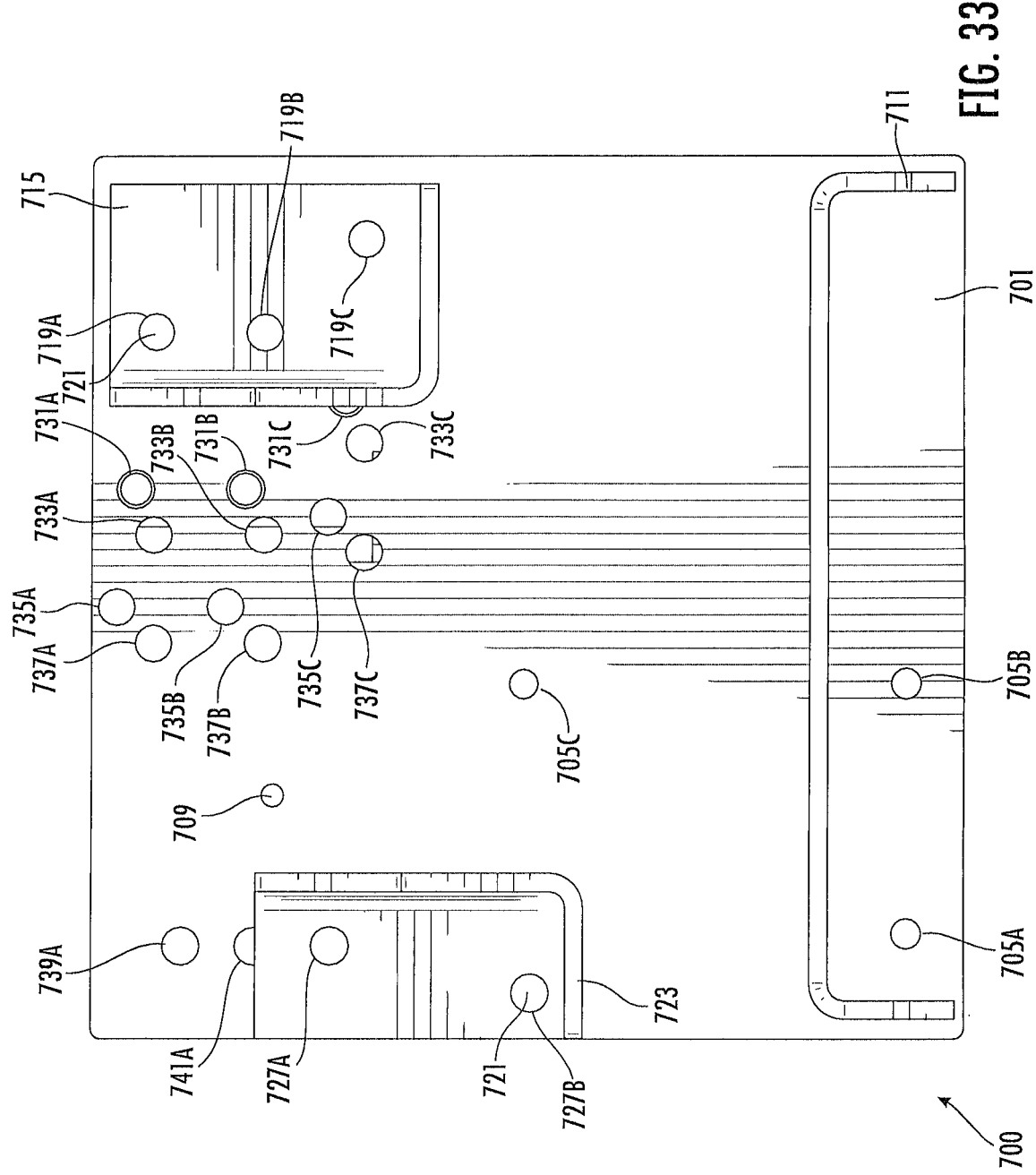
FIG. 33 is a top view of an alternative embodiment of an adjustable mounting caster plate from FIG. 31.
Figure 34:
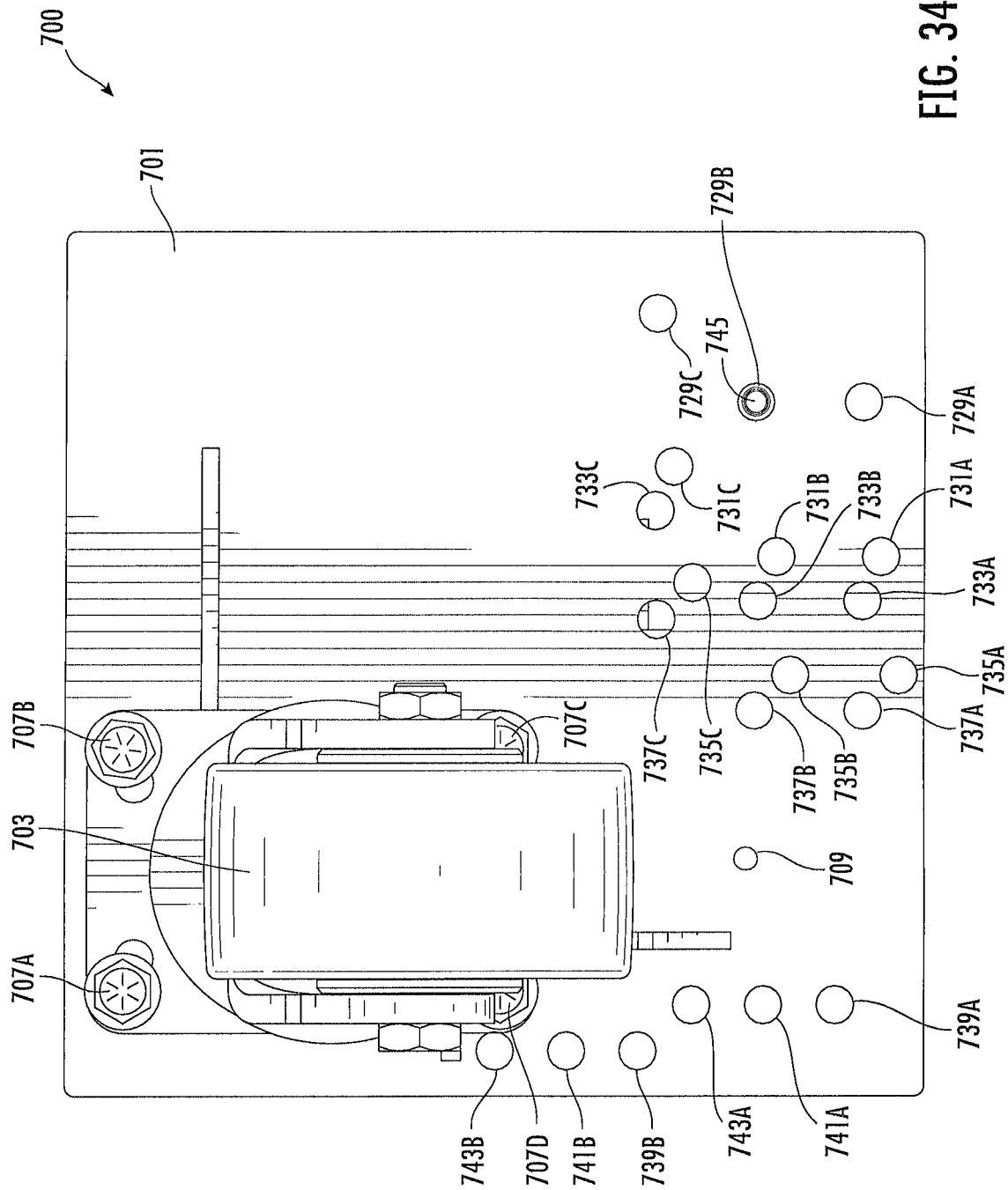
FIG. 34 is a bottom view of an alternative embodiment of an adjustable mounting caster plate from FIG. 31.

Referring now also to FIGS. 28-30 in the drawings, varying views of an alternative embodiment adjustable caster mounting plate 600 are depicted. Alternative adjustable caster mounting plate 600 is comprised of base plate 601, caster assembly 603, apertures 605A-605D, caster fasteners 607A-607D, plate fastening hole 609, mounting tab 611, mounting tab fastening holes 613A-613B, primary adjustable guide tab 615, primary guide tab fastening hole 617, primary guide tab pin hole 619A-619C, pin 621, secondary guide tab 623, secondary guide tab fastening hole 625, primary guide tab first position apertures 627A-627C, primary guide tab second position apertures 629A-629C, primary guide tab third position apertures 631A-631C, primary guide tab fourth position apertures 633A-633C, primary guide tab fifth position apertures 635A-635C, plate attachment point 637, connector 639, and guide tab attachment point 641. The structure and functionality of adjustable caster mounting plate 600 has the same structure and functionality of adjustable caster mounting plate 500 except that secondary guide tab 623 is not adjustable. Secondary guide tab 623 is welded or fastened directly to the surface of base plate 601 which increases the stability of guide tab 623 when attached to a base board but lowers the versatility of use for secondary guide tab 623. While primary adjustable guide tab 615 can still be adjusted to accommodate base boards with different widths, the distance between secondary guide tab 623 and mounting tab 611 will stay consistent.

Referring now to FIGS. 31-34 in the drawings, varying views of an alternative embodiment adjustable caster mounting plate 700 are depicted. Alternative adjustable caster mounting plate 700 is comprised base plate 701, caster assembly 703, apertures 705A-705D, caster fasteners 707A-707D, plate fastening hole 709, mounting tab 711, mounting tab fastening holes 713A-713B, primary adjustable guide tab 715, primary guide tab fastening hole 717, primary guide tab pin hole 719A-719C, pin 721, secondary adjustable guide tab 723, secondary guide tab fastening hole 725, secondary guide tab pin hole 727A-727B, primary guide tab first position apertures 729A-729C, primary guide tab second position apertures 731A-731C, primary guide tab third position apertures 733A-733C, primary guide tab fourth position apertures 735A-735C, primary guide tab fifth position apertures 737A-737C, secondary guide tab first position apertures 739A-739B, secondary guide tab second position apertures 741A-741B, secondary guide tab third position apertures 743A-743B, and threaded pin length 745. Mounting plate 700 has the same structure and functionality as mounting plate 100 of the preferred embodiment, however, mounting plate 700 further has threaded pin length 745. In the drawings, pin 721 extends beyond the bottom of base plate 701 and has thread length 741. In previous embodiments, pin 721 was not threaded nor did pin extend beyond the lower surface of base plate 701 and was instead flush with the bottom of base plate 701. However, by using threaded length 741, pin 721 will be more secure connecting primary adjustable guide tab 715 and base plate 701 as pins 721 will not easily be extracted. Having pin 721 have a longer length decreases the chance that pin 721 be removed from base plate 701 accidently as there will be a longer section of pin that has to be unscrewed before adjustable guide tab 715 can be moved. It is also appreciated, that while the drawings in the present application only show one pin 721 with threaded pin length 745 extending out the bottom of base plate 701, alternative embodiments can exist where there is more than one pin 721 with threaded length 745 connecting both guide tabs 715 and 723 to base plate 701.

Figure 35:
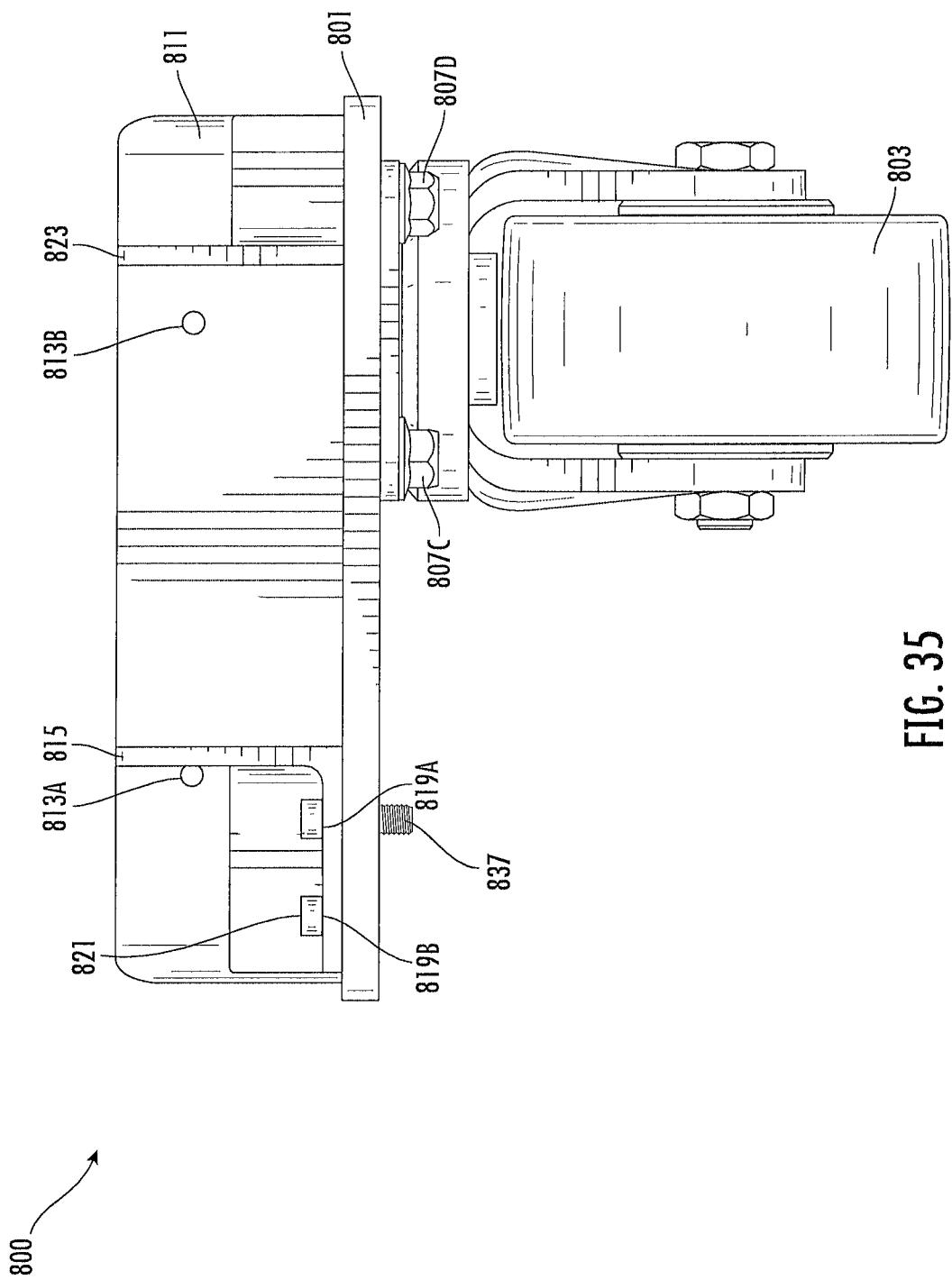
FIG. 35 is a back view of an adjustable mounting caster plate according to an alternative embodiment of the present application.
Figure 36:
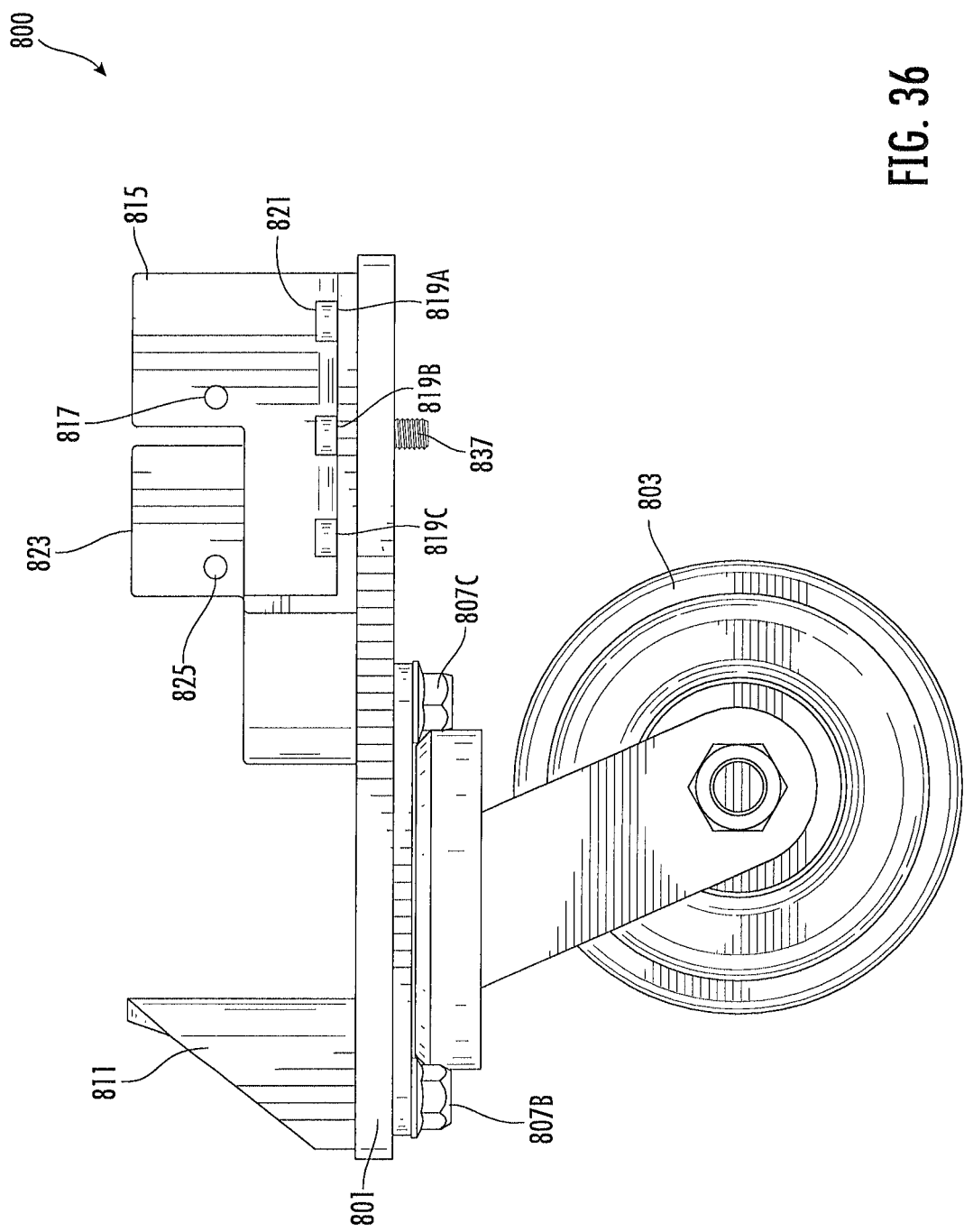
FIG. 36 is a side view of an alternative embodiment of an adjustable mounting caster plate from FIG. 35.
Figure 37:
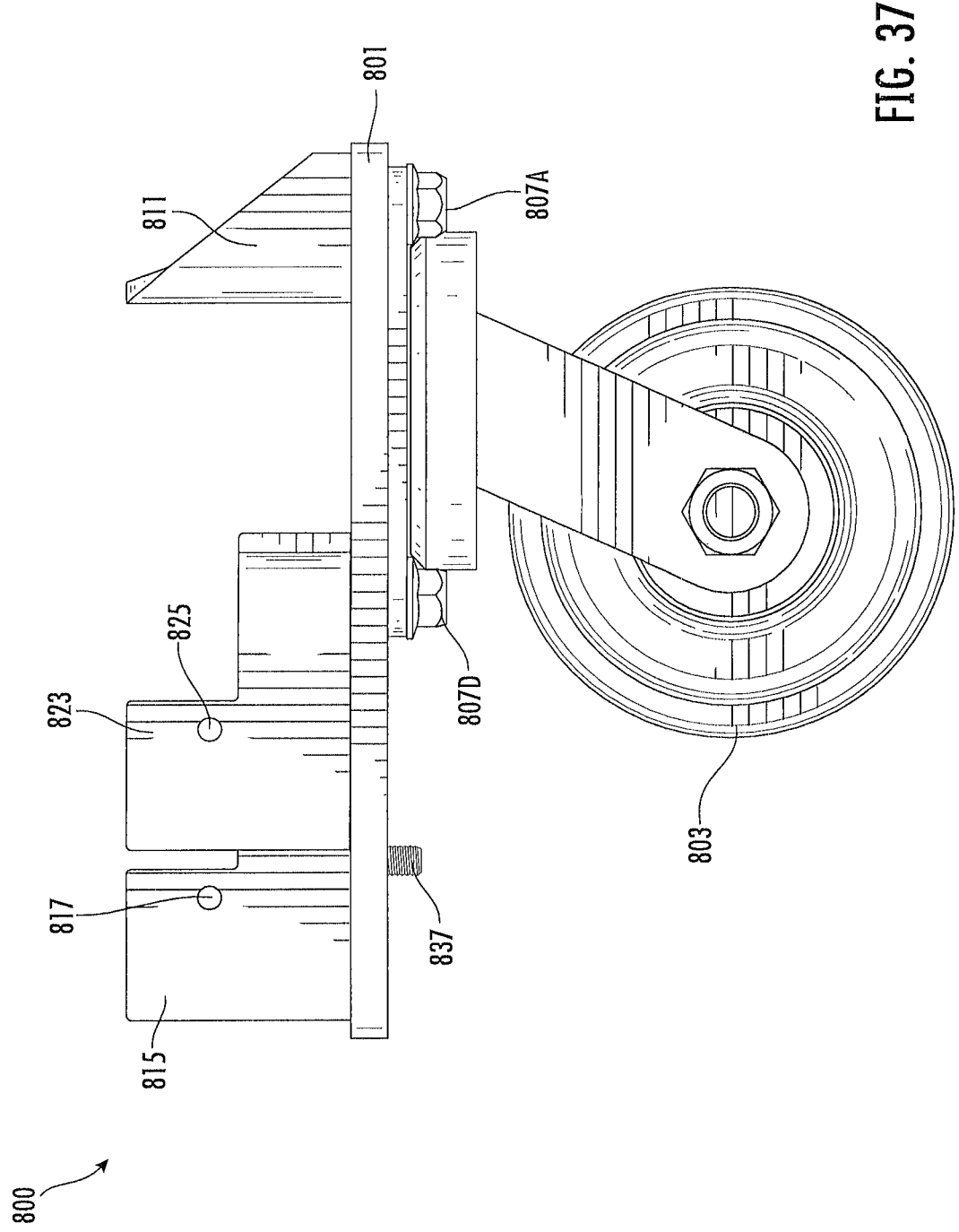
FIG. 37 is a side view of an alternative embodiment of an adjustable mounting caster plate from FIG. 35.

Referring now also to FIGS. 35-37 in the drawings, varying views of an alternative embodiment adjustable caster mounting plate 800 are depicted. Alternative adjustable caster mounting plate 800 is comprised of base plate 801, caster assembly 803, apertures 805A-805D, caster fasteners 807A-807D, plate fastening hole 809, mounting tab 811, mounting tab fastening holes 813A-813B, primary adjustable guide tab 815, primary guide tab fastening hole 817, primary guide tab pin hole 819A-819C, pin 821, secondary guide tab 823, secondary guide tab fastening hole 825, primary guide tab first position apertures 827A-827C, primary guide tab second position apertures 829A-829C, primary guide tab third position apertures 831A-631C, primary guide tab fourth position apertures 833A-833C, primary guide tab fifth position apertures 835A-835C, and threaded pin length 837. The structure and functionality of adjustable caster mounting plate 800 has the same structure and functionality of adjustable caster mounting plate 700 except that secondary guide tab 823 is not adjustable. Secondary guide tab 823 is welded or fastened directly to the surface of base plate 801 which increases the stability of guide tab 823 when attached to a base board but lowers the versatility of use for secondary guide tab 823. While primary adjustable guide tab 815 can still be adjusted to accommodate base boards with different widths, the distance between secondary guide tab 823 and mounting tab 811 will stay consistent.

Figure 38:
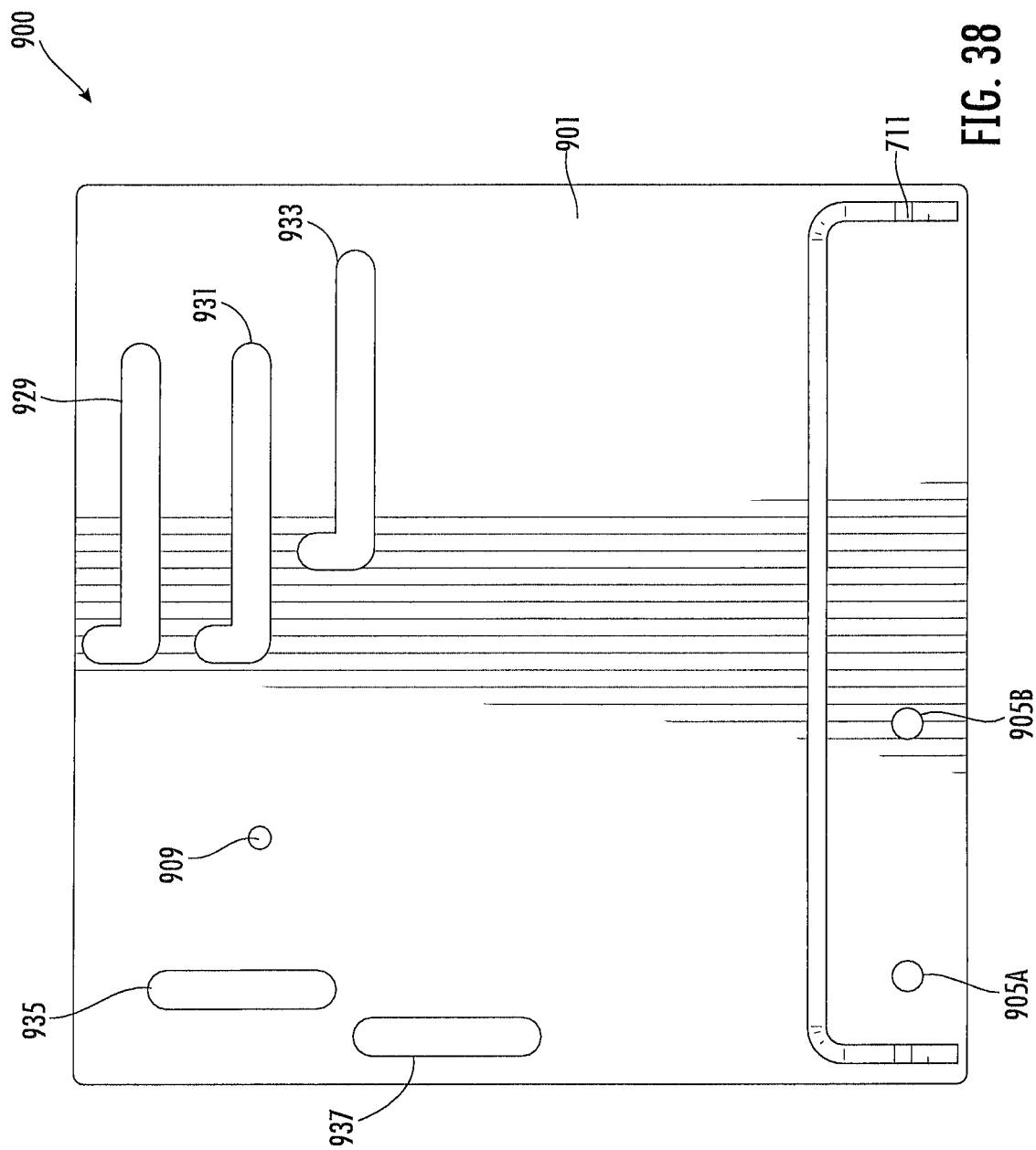
FIG. 38 is a top view of an adjustable mounting caster plate according to an alternative embodiment of the present application.

Referring now also to FIG. 38 in the drawings, a top view of alternative embodiment adjustable caster mounting plate 900 is depicted. Alternative adjustable caster mounting plate 900 is comprised of base plate 901, caster assembly 903, apertures 905A-905D, caster fasteners 907A-907D, plate fastening hole 909, mounting tab 911, mounting tab fastening holes 913A-913B, primary adjustable guide tab 915, primary guide tab fastening hole 917, primary guide tab pin hole 919A-919C, pin 921, secondary adjustable guide tab 923, secondary guide tab fastening hole 925, secondary guide tab pin hole 927A-927B, primary guide tab first position slot 929, primary guide tab second position slot 931, primary guide tab third position slot 933, secondary guide tab first position slot 935, and secondary guide tab second position slot 937. The structure and functionality of adjustable caster mounting plate 900 has the same structure and functionality of adjustable caster mounting plate 100 except that the position apertures in mounting plate 100 are slots in mounting plate 900 disposed through base plate 901 instead of being a series of apertures. When using slots in this manner, guide tabs 915 and 923 will be tightened in place using fasteners once tabs 915 and 923 are at a desired location. To move guide tabs 915 and 923, tab 915 and 923 will be loosened and moved along the position slots until reaching a new desired location and secured in place again. This increases the number locations where guide tabs 915 and 923 can be secured and allow for irregular shaped modular structures 1100 to be secured.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An adjustable caster mounting plate for supporting a structure, comprising:
   a base plate;
   a primary guide tab releasably coupled to the base plate for receiving a base of the structure;
   a secondary guide tab coupled to the base plate for receiving the base of the structure;
   a mounting tab coupled to the base plate for receiving the base of the structure;
   a first channel extending between the primary guide tab and the secondary guide tab for receiving the base of the structure;
   a second channel extending between the secondary guide tab and the mounting tab for receiving the base of the structure, wherein the second channel is perpendicular to the first channel; and
   a caster assembly releasably coupled with the base plate;
   wherein the base plate further comprises:
   at least two primary guide tab position apertures passing through the base plate for receiving the primary guide tab and for selectively locating the primary guide tab relative to the base plate to adjust a width of the first channel extending between the primary guide tab and the secondary guide tab:
   wherein the primary guide tab is configured to be retained at any of the at least two primary guide tab position apertures.

2. The adjustable caster mounting plate of claim 1, wherein
   the primary guide tab comprises:
   a base portion;
   at least one upstanding wall disposed on a side of the base; and
   at least one fastening hole disposed through the at least one upstanding wall, the fastening hole being positioned such that a fastener is configured to be inserted through the at least one fastening hole to retain the base of the structure.

3. The adjustable caster mounting plate of claim 2, wherein the primary guide tab further comprises:
   at least one guide tab pin hole disposed through the base portion; and
   at least one pin disposed through the at least one guide tab pin hole for retaining the primary guide tab to the base plate.

4. The adjustable caster mounting plate of claim 3, wherein the at least one pin extends through the base plate and is restrained by at least one retaining pin.

5. The adjustable caster mounting plate of claim 3, wherein the base plate further comprises:
   at least one plate attachment point disposed on the base plate;
   at least one guide tab attachment point disposed on the primary guide tab; and
   at least one connector coupling the at least one plate attachment point to the at least one guide tab attachment point for retaining the primary guide tab to the base plate.

6. The adjustable caster mounting plate of claim 5, wherein the connector coupling is one or more of the following:
   a length of metallic material;
   a length of plastic material;
   a length of chain material;
   a length of textile material; and
   a length of wire material.

7. The adjustable caster mounting plate of claim 3, wherein the primary guide tab further comprises:
   a threaded portion disposed at the bottom of the at least one pin for retaining the primary guide tab to the mounting plate.

8. The adjustable caster mounting plate of claim 1, wherein the secondary guide tab comprises:
   a base portion;
   at least one upstanding wall disposed on a side of the base; and
   at least one fastening hole disposed through the at least one upstanding wall, the fastening hole being positioned such that a fastener is configured to be inserted through the at least one fastening hole to retain the base of the structure;
   wherein the secondary guide tab is releasably coupled to the base plate.

9. The adjustable caster mounting plate of claim 8, wherein the base plate comprises:
   at least one secondary guide tab position aperture passing through the base plate for receiving the secondary guide tab and for selectively locating the secondary guide tab relative to the base plate.

10. The adjustable caster mounting plate of claim 8, wherein the base plate further comprises:
    at least two secondary guide tab position apertures passing through the base plate for receiving the secondary guide tab and for selectively locating the secondary guide tab relative to the base plate;
    wherein the secondary guide tab is configured to be retained at any of the at least two secondary guide tab position apertures.

11. The adjustable caster mounting plate of claim 9, wherein the secondary guide tab further comprises:
    at least one guide tab pin hole disposed through the base portion; and
    at least one pin disposed through the at least one guide tab pin hole for retaining the secondary guide tab to the base plate.

12. The adjustable caster mounting plate of claim 11, wherein the at least one pin extends through the base plate and is restrained by at least one retaining pin.

13. The adjustable caster mounting plate of claim 11, wherein the base plate further comprises:
    at least one plate attachment point disposed on the base plate;

at least one guide tab attachment point disposed on the secondary guide tab; and at least one connector coupling the at least one plate attachment point to the at least one guide tab attachment point for retaining the secondary guide tab to the base plate.

14. The adjustable caster mounting plate of claim 13, wherein the connector coupling is one or more of the following:

a length of metallic material;
a length of plastic material;
a length of chain material;
a length of textile material; and
a length of wire material.

15. The adjustable caster mounting plate of claim 11, wherein the secondary guide tab further comprises:

a threaded pin portion disposed at the bottom of the at least one pin for retaining the secondary guide tab to the mounting plate.

16. The adjustable caster mounting plate of claim 1, wherein the secondary guide tab is permanently coupled to the base plate.

17. The adjustable caster mounting plate of claim 1, wherein the mounting tab comprises:

a pair of upstanding side walls;
an upstanding wall disposed between the pair of upstanding side walls; and
at least one fastening hole disposed through the upstanding wall, the at least one fastening hole being positioned such that, a fastener is configured to be inserted through the at least one fastening hole to retain the base of the structure.

18. The adjustable caster mounting plate of claim 1, wherein the mounting tab is releasably coupled to the base plate.

19. A method for supporting and moving structures along an assembly line comprising:

providing an adjustable caster mounting plate, comprising:
a base plate;
a primary guide tab releasably coupled to the base plate for receiving a base of the structure;
a secondary guide tab coupled to the base plate for receiving the base of the structure;
a mounting tab coupled to the base plate for receiving the base of the structure;
a first channel extending between the primary guide tab and the secondary guide tab for receiving the base of the structure;
a second channel extending between the secondary guide tab and the mounting tab for receiving the base of the structure, wherein the second channel is perpendicular to the first channel; and
a caster assembly releasably coupled with the base plate;
wherein the base plate further comprises:
at least two primary guide tab position apertures passing through the base plate for receiving the primary guide tab and for selectively locating the primary guide tab relative to the base plate to adjust a width of the first channel extending between the primary guide tab and the secondary guide tab;
wherein the primary guide tab is configured to be retained at any of the at least two primary guide tab position apertures;
placing the base of the structure onto the base plate;
securing the base of the structure to the base plates using fasteners inserted through the primary guide tab, through the secondary guide tab, through the mounting tab, or through the primary guide tab, the secondary guide tab, and the mounting tab;
using the caster assembly coupled to the base plate to maneuver the structure to the desired location.

\* \* \* \* \*